United States Patent [19]
Baxter

[11] Patent Number: 5,209,131
[45] Date of Patent: May 11, 1993

[54] METROLOGY

[75] Inventor: Iain K. Baxter, Chesham, Great Britain

[73] Assignee: Rank Taylor Hobson, Great Britain

[21] Appl. No.: 596,696

[22] Filed: Oct. 12, 1990

[30] Foreign Application Priority Data

Nov. 3, 1989 [GB] United Kingdom ............... 8924852
Nov. 3, 1989 [GB] United Kingdom ............... 8924853

[51] Int. Cl.$^5$ ............................................. G01B 5/00
[52] U.S. Cl. ....................................... 73/865.8; 33/559
[58] Field of Search ............... 73/865.8, 105; 33/556, 33/558, 558.01, 559, 560, 561, 572

[56] References Cited

U.S. PATENT DOCUMENTS

| 3,945,124 | 3/1976 | Jacoby et al. | 33/559 |
|---|---|---|---|
| 4,177,568 | 12/1979 | Werner et al. | |
| 4,437,151 | 3/1984 | Hurt et al. | |
| 4,523,382 | 6/1985 | Werner et al. | 33/556 |
| 4,879,916 | 11/1989 | Juillerat | 33/561 |
| 4,964,223 | 10/1990 | Linder et al. | 33/556 |

FOREIGN PATENT DOCUMENTS

| WO8505176 | 11/1985 | European Pat. Off. |
|---|---|---|
| 0169133 | 1/1986 | European Pat. Off. |
| 0240151 | 10/1987 | European Pat. Off. |
| 0279926 | 12/1987 | European Pat. Off. |
| 0297449 | 1/1989 | European Pat. Off. |
| 2384230 | 3/1978 | France |
| 913031 | 6/1980 | U.S.S.R. |
| 1499003 | 1/1978 | United Kingdom |
| 2004656 | 4/1979 | United Kingdom |
| 2112139 | 7/1983 | United Kingdom |
| 2163256 | 2/1986 | United Kingdom |
| 2197478 | 5/1988 | United Kingdom |
| 2208934 | 4/1989 | United Kingdom |
| 2215843 | 9/1989 | United Kingdom |
| 8400605 | 2/1984 | World Int. Prop. O. |
| 8806714 | 9/1988 | World Int. Prop. O. |

OTHER PUBLICATIONS

"Machine Checking Gauge", Renishaw PLC, p. 15 and XXI.
Coordinate Measuring Machines, British Standard, Part 3, Code of Practice.
Official letter and translation accompanying U.S.S.R. Patent No. 913031.

Primary Examiner—Robert Raevis
Attorney, Agent, or Firm—Lerner, David, Littenberg, Krumholz & Mentlik

[57] ABSTRACT

A multiaxis measuring probe 10 for continuous measurement of workpieces (e.g. roundness, other form, or size measurment) has in one embodiment a stylus 50 suspended by resilient forces acting in opposition so as to determine an equilibrium rest position. This appears to improve the dynamic response/accuracy trade-off of the probe. The resilient forces are preferably provided by a diaphragm spring 40,140,210 and one or more opposing springs 80A,80B,180,214. The stylus 50 is preferably held magnetically to a stylus mount 34,134,206,208 via precision bearings, and the resilient forces act on the stylus mount. During calibration, a series of probe data is gathered from probe/sensor output signals at given positions of the probe along curved paths. A corresponding series of positional data for the given positions is gathered independently of the probe. A correlation is made between the probe data and the positional data so as to obtain calibration parameters for correction of measurement signals. These calibration parameters are stored with a measurement expression for later use with probe output signals to obtain corrected measurement signals.

17 Claims, 9 Drawing Sheets

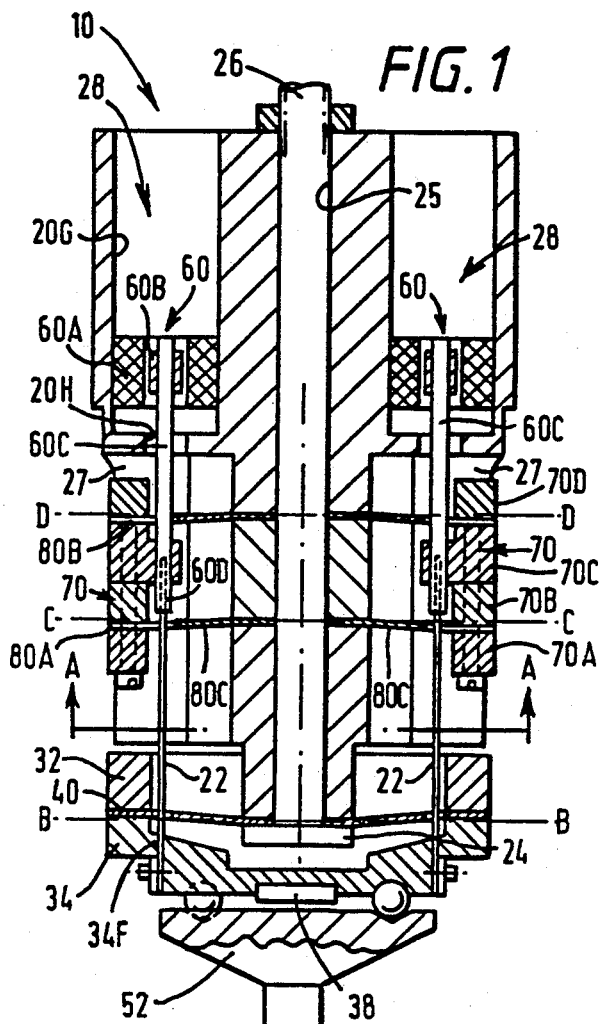
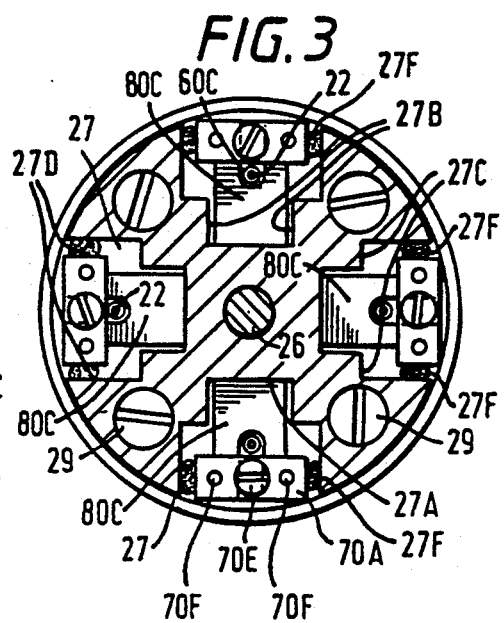
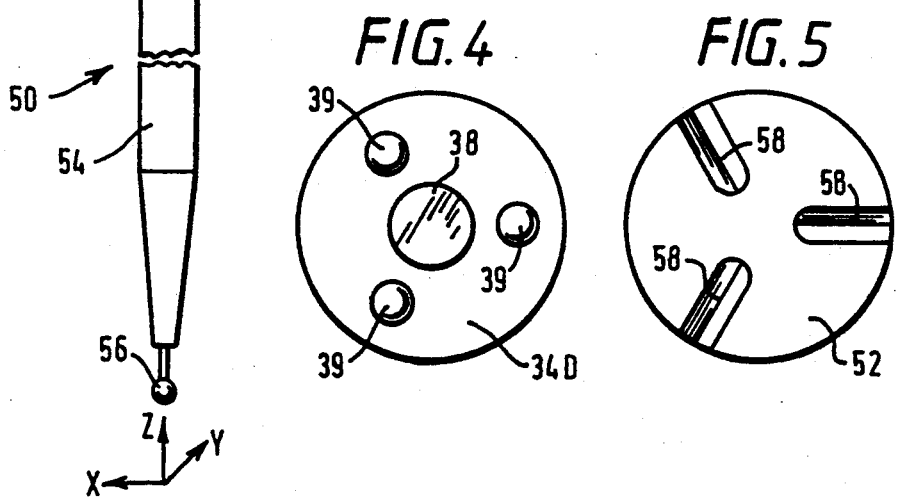

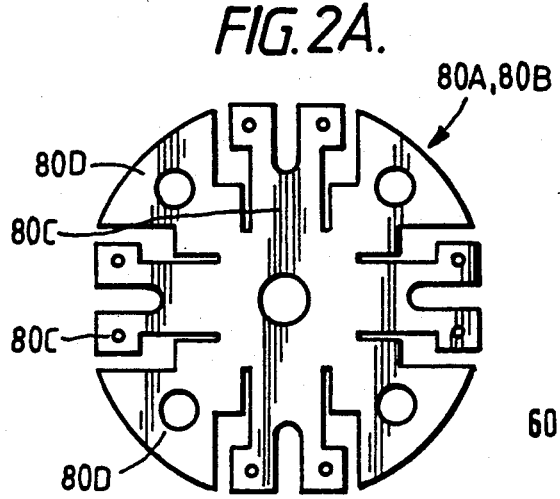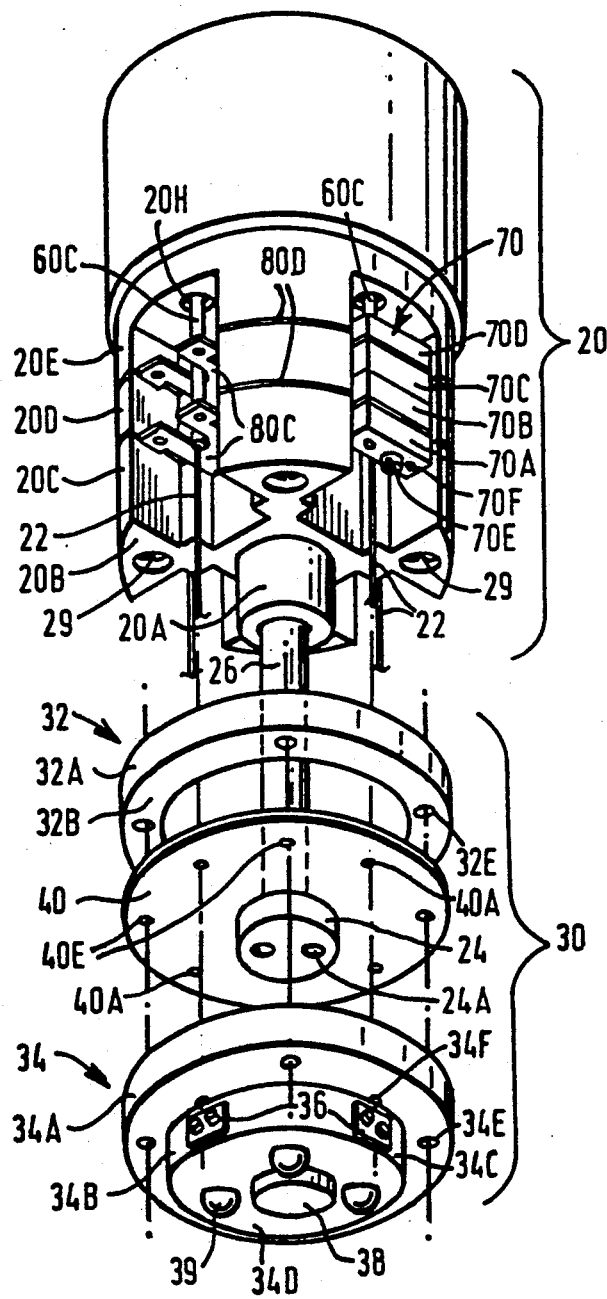

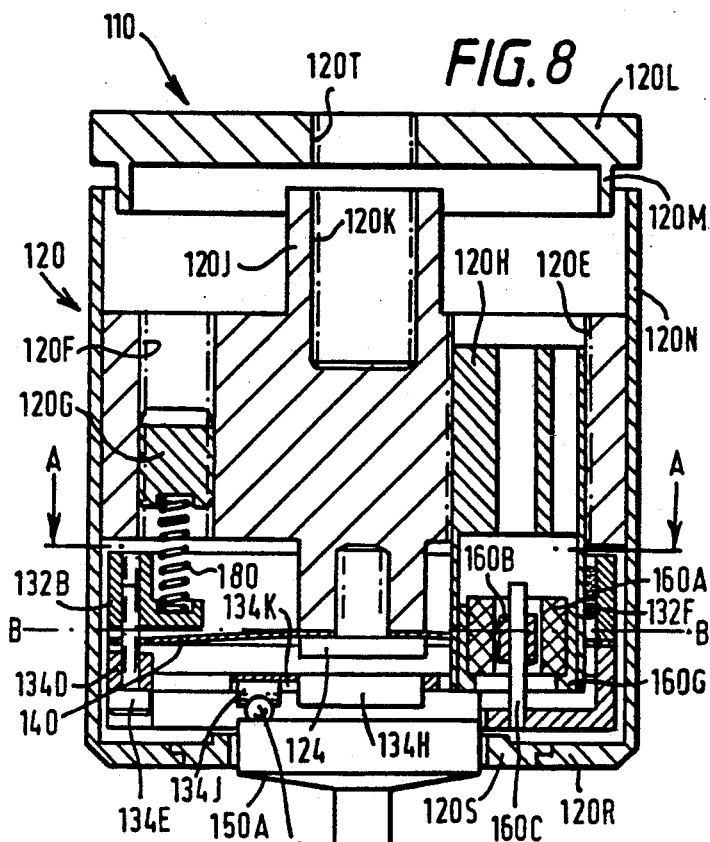
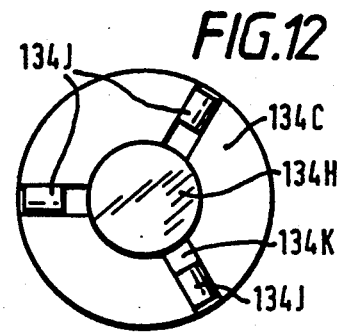
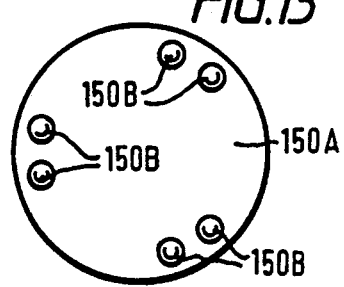
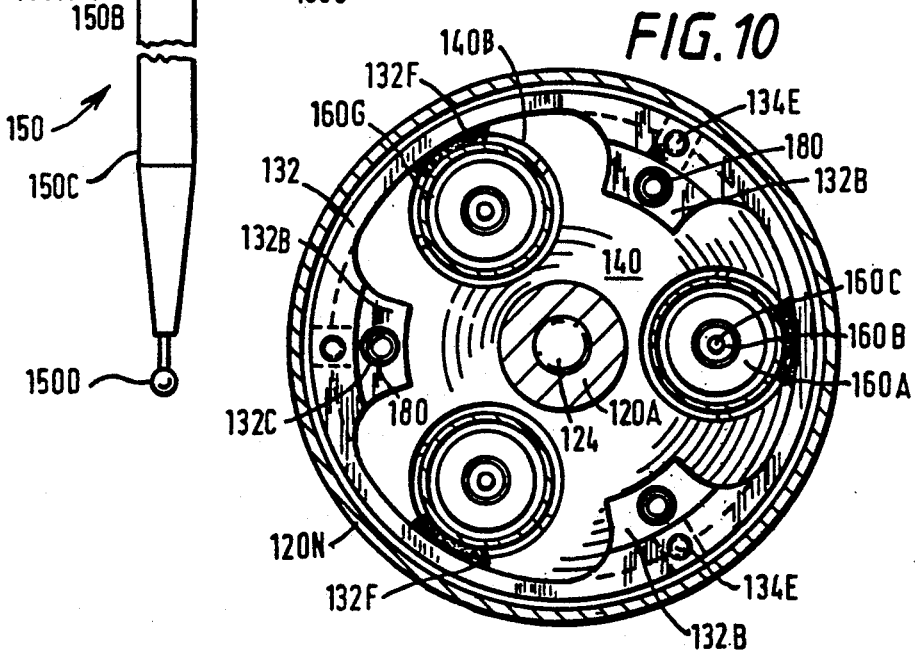

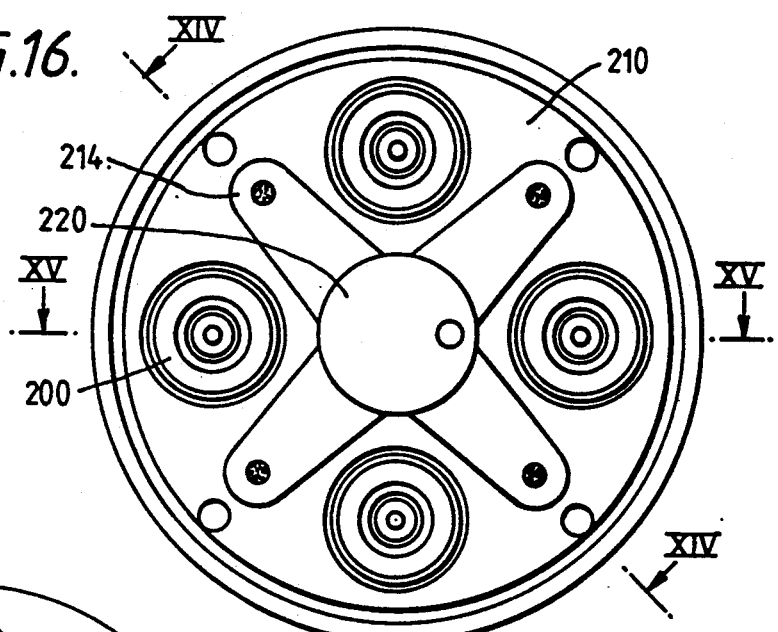
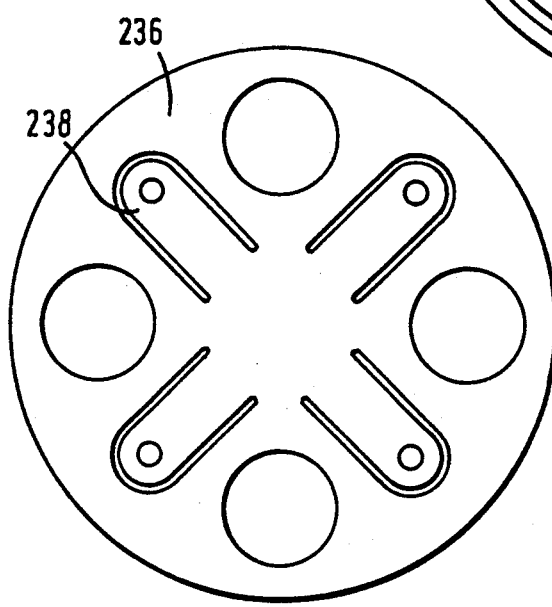
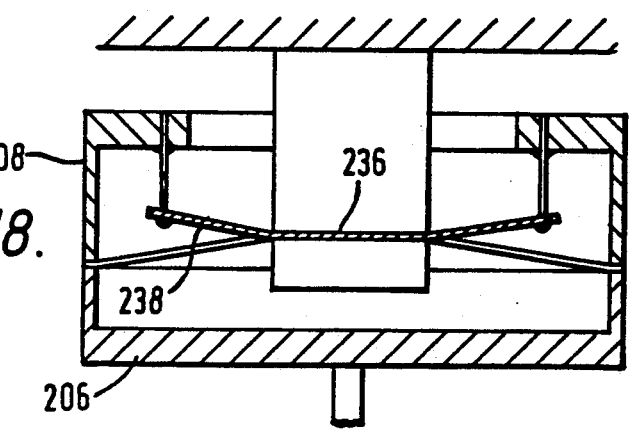

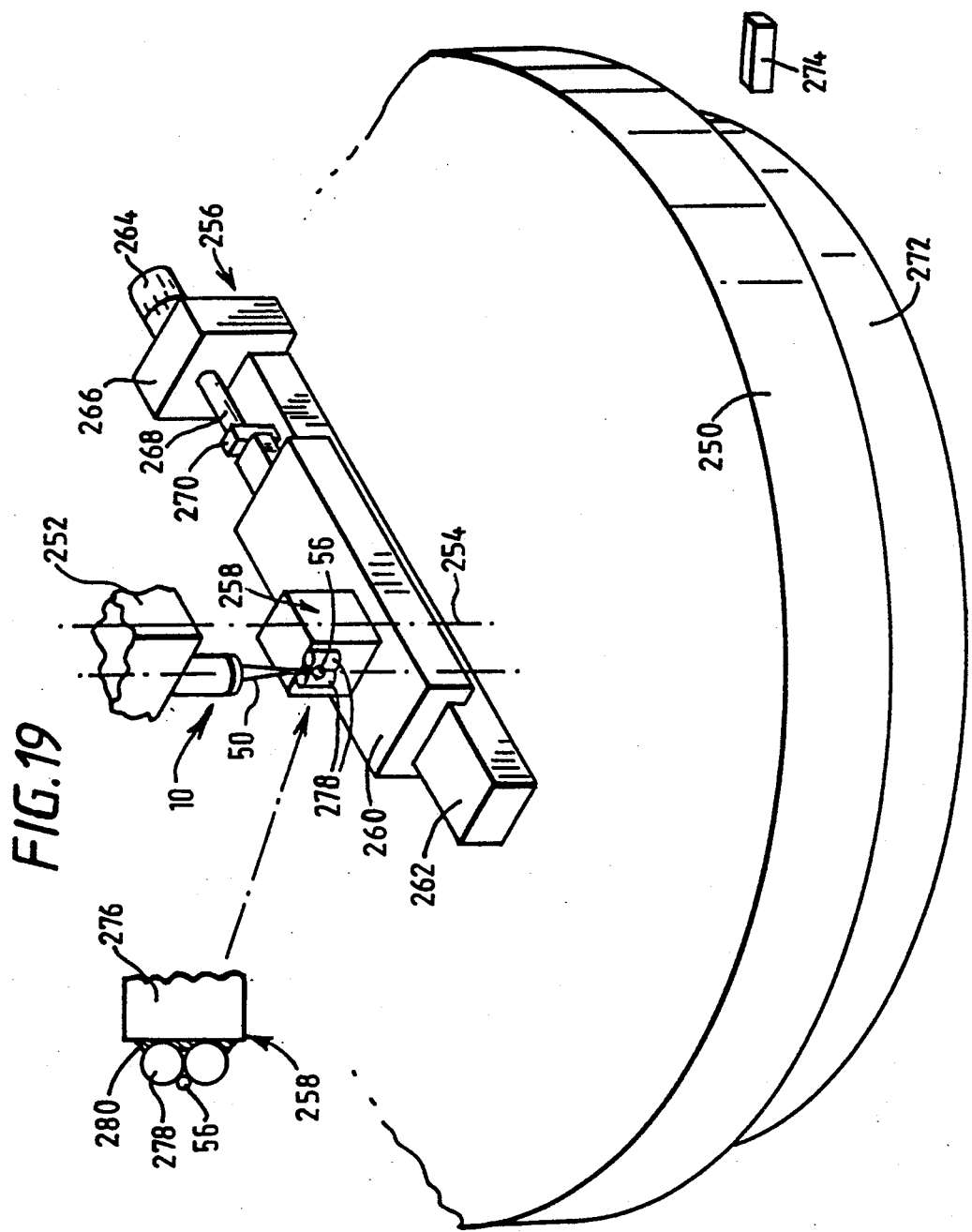

METROLOGY

This invention relates to a measuring probe, and more particularly a measuring probe capable of responding to multiaxis variations in a workpiece.

An embodiment provides a multiaxis continuous measuring probe for use in metrology and more particularly form measurement responsive to three dimensional variations in a workpiece in conjunction with a measuring machine with means for displacing the probe so that the derived data is obtained as a function of both the probe signals and the displacement signals: see European Patent No. 240151A.

Continuous probes for form measurement are distinguished from trigger probes. Continuous probes measure the form of a workpiece by continuous contact therewith. The measurement may take place as a series of measurements each for a given surface area of the workpiece owing to the fact that because of the three dimensional contour of the workpiece, the probe has to be re-positioned between such measurements. Such probes are readily distinguished from trigger probes which make intermittent contact for co-ordinate measurement readings. Furthermore, trigger probes have a rest position which is mechanically defined whereby the rest position defines a fixed datum position from which all displacements occur and which must always be repeatable: the displacement of the stylus triggers an output signal giving the co-ordinates at which the contact was made rather than output signals which are themselves a measure of the probe displacement.

It will be appreciated by those skilled in metrology that measuring probes operate in a defined displacement range and that their accuracy is rated for operation within that range. From GB Patent No. 1499003 it is known to have probes for which provision for stylus movement in X,Y and Z axes is provided by separate sets of resilient suspension means, i.e. three orthogonal sets of leaf springs, the rest position of the stylus being the relaxed condition of each set of springs. With these probes, their size imposes limitations on the ability of the probe to access complex workpieces, the inertia of their moving parts imposes limitations on the rate at which data can be gathered.

The rate at which data can be gathered is directly related to the frequency response of the probe. The frequency response is the parameter related to the speed at which the probe tip can follow variations in the contour—if the frequency response is insufficient the probe tip may lose contact with the workpiece and this must be avoided in continuous form measurement. For example in roundness measurement, the workpiece is rotated on a turntable—the maximum speed of rotation is governed mainly by the frequency response of the measuring probe. A probe with a higher frequency response permits a wider range of rotational speeds to be employed and facilitates the ability of the probe to follow contour variations at such rotational speeds. A higher rotational speed thus increases the rate of acquisition of data (the data acquisition rate) and the productivity of a machine used for the inspection of workpieces: adequate frequency response enhances the advantages of multiaxis probes relative to single axis probes, the latter requiring several re-orientations to complete all the measurement data.

The frequency response of a probe is affected by the inertia of the probe's moving parts and by the gauging stiffness of the stylus. A high inertia reduces the frequency response and a high gauging stiffness increases it. Thus a good frequency response can only be obtained with a high inertia probe by providing a high gauging stiffness. However, a high gauging stiffness results in a high force applied to a workpiece by the stylus tip, and if this force is too high the accuracy of measurements using the probe will deteriorate.

GB Patent 2004656 shows another construction of measuring probe with a multiaxis displacement capability, which mounts the stylus relative to a housing by means of a resilient member fixed at one boundary thereof and with the datum position being determined by the resilient member urging a mounting plate for the stylus into engagement with the housing from which position it is displaced by stylus displacement about several different pivot points. This arrangement also is subject to the aforementioned disadvantages especially in terms of accuracy and repeatability of results (due to the mechanical variations arising from more than one pivot point) and the frequency response.

GB 2112139 shows an arrangement of cables and springs acting on various members including a stylus. None of the springs appear to be opposed, and there appears to be nothing to prevent all the springs from simultaneously closing up. All parts appear to be able to twist freely, and there is no indication of how movement of the stylus tip could result in measurement output signals.

This invention seeks to overcome these disadvantages and in particular, in embodiments, to provide a probe which has the characteristics of improved accuracy, and repeatability of the results obtained and an increased frequency response. Furthermore, for form measurements carried out on a roundness instrument, the embodiments of the present invention recognise the desirability of the stiffness of the probe in the axial direction of the stylus (Z direction) being of a higher order than the stiffness of the probe in terms of X and Y direction movement of the stylus. This gauging stiffness is related to the gauging force which is applied to the stylus to obtain a displacement.

An embodiment will further provide for the relocation of the stylus in use without deterioration in the repeatability of results.

The present invention has various aspects. According to one aspect there is provided a probe for measuring of workpieces, comprising means for mounting a stylus suspended by restoring forces acting in opposition at least one of which is resilient so as to determine an equilibrium rest position.

Provision may be made for the adjustment of at least one of the restoring forces.

By a resilient force is meant a force the strength of which increases with movement in the direction against the force, e.g. the force typically applied by a spring. Because the strength of the force varies with movement, it can be used in opposition to one or more other forces to define an equilibrium position. It should be noted that the opposing force or forces do not necessarily need to be resilient, although in practice they typically will be resilient. If a resilient force is opposed by a constant force, an equilibrium will occur at the position at which the strength of the resilient force equals the constant force.

According to another aspect there is provided a probe for multi-axis continuous measurement on workpieces comprising a stylus mounting suspended by restoring forces acting in opposition at least one of which is resilient so as to determine an equilibrium rest position.

This multiaxis probe has freedom of movement, within its measurement range, in the X,Y plane and along its Z-axis. The rest position is nominally located at the intersection of the X,Y axes (notionally the centre of the X,Y range in the X,Y plane) and at the extremity of outward travel along the Z-axis. After displacement of the stylus in any direction, it will return to the approximate rest position: in practice, this approximate rest position will be within 10 microns of the theoretical centre. This difference between one rest position and the previous rest position does not result in a measurement error because the exact rest position of the stylus is always known by reading sensor signals.

The stylus movement of such a probe is not limited to discrete translational movement in the X,Y or Z directions, but for instance it can follow an arcuate path in the X,Y plane.

In this specification, the movement of a probe stylus is described as "arcuate" to refer to movement in which the stylus tilts. The movement may, but does not necessarily, have a single constant centre for the tilt so that the stylus tip moves on the surface of a sphere. Normally the probe has a longitudinal axis along the Z direction, and in its rest position the stylus normally extends in this direction. Because of the tilting of the stylus, arcuate movement in the X and/or Y directions will typically be accompanied by some Z displacement. Accordingly, references in this specification to movement and position of the stylus tip in the XY plane and in X, Y or XY directions do not imply that the value of Z for the stylus tip necessarily remains constant, but refer to the movement and position of the projection of the stylus tip onto the XY plane in response to X and/or Y direction forces in the absence of any applied force in the Z direction. An XY direction is any direction in the XY plane.

According to another aspect of the present invention there is provided a probe for measuring workpieces, the probe comprising a body and a stylus or stylus mount having a rest position relative to the body defined by the equilibrium between a plurality of forces. In the illustrated embodiments, the probe has a stylus mount on which a stylus is or can be mounted, and the forces act in the first place on the stylus mount. However, arrangements are possible in which the forces act directly on the stylus.

Typically, the probe comprises first and second resilient members, the first resilient member acting on the stylus or stylus mount in a first direction and the second resilient member acting on the stylus mount in a second direction opposing the first. There may also be one or more further resilient members each acting in a direction opposing the first direction.

Alternatively the probe may comprise a resilient member having a first part acting on the stylus or stylus mount in a first direction and a second part acting on the stylus or stylus mount in a second direction opposing the first.

Preferably the probe comprises a resilient diaphragm which in the rest position of the stylus or stylus mount is pre-stressed into a conical shape. This pre-stressing stabilises the diaphragm, and improves its performance if it is used as a pivot for arcuate movement of the stylus or stylus mount.

One direction is considered to oppose another if it has a component which is anti-parallel to the other, that is to say it has a component parallel but in the reverse direction to the other. Resilient members or parts oppose each other if they cannot both simultaneously be relieved.

According to another aspect there is provided a probe for multiaxis continuous measurement on workpieces, comprising a housing, a stylus assembly, a resilient diaphragm by which the stylus assembly is mounted on the housing for movement in the X, Y and Z directions, sensors associated with the stylus assembly, said sensors being arranged to produce sensor signals dependent on the movement of the stylus assembly relative to the housing, wherein resilient biassing means and said diaphragm are so arranged that said stylus assembly is suspended by restoring forces acting in opposition at least one of which is resilient so as to determine an equilibrium rest position.

Suitable sensors, which are well known in the art, are exemplified herein by inductive transducers, but other types such as capacitive or optical sensors may be used.

According to another aspect there is provided a probe for multiaxis measurement on workpieces, comprising a housing, a stylus assembly, a resilient diaphragm by which the stylus assembly is mounted on the housing for movement in the X, Y and Z directions, sensors associated with the stylus assembly, said sensors being arranged to produce sensor signals dependent on the movement of the stylus assembly relative to the housing, wherein said diaphragm is prestressed in the rest position of the stylus.

According to another aspect there is provided a probe for multiaxis measurement on workpieces, comprising a housing, a stylus assembly, a resilient diaphragm by which the stylus assembly is mounted on the housing for movement in the X, Y and Z directions, transducers linked to the stylus assembly, said tranducers being arranged to produce signals dependent on the movement of the stylus assembly relative to the housing, wherein linkage means are arranged to constrain movement of a movable element of each transducer to substantially linear movement in response to movement of the stylus assembly.

In the preferred embodiment, the sensors are inductive transducers and the movable element is an armature carrier.

According to another aspect, there is provided a measuring probe comprising:
a body;
a stylus or stylus mount;
first restoring means supporting the stylus or stylus mount relative to the body for movement through a measuring range and applying a first restoring force between the body and the stylus or stylus mount;
second restoring means acting on the body and the stylus or stylus mount and applying a second restoring force therebetween opposing the first restoring force; and
at least one transducer providing an output in accordance with the position or movement of the stylus or stylus mount;
the first and second restoring means providing the first and second restoring forces in opposition to each other throughout the said measuring range.

The stylus may include a locator plate adapted to be magnetically and displaceably mounted on a mounting plate. The locator plate and the mounting plate may be aligned by spaced elements on one thereof resting in seating means on the other thereof. The spaced elements may be spherical elements (e.g. ball bearings) and the seating means may be a groove or a seat formed by seating elements such as spaced roller bearings. The spaced elements may be arranged with equi-angular spacing.

According to another aspect of the invention there is provided a method of mounting a stylus on a probe for form measurement in which the stylus is held by an attractive force against a stylus mount, the stylus and the stylus mount having mutually contacting precision locating surfaces which act on each other under the influence of the attractive force to urge the stylus into a pre-defined position relative to the stylus mount.

In general, measuring meachines may need or benefit from calibration in order to provide accurate measurement outputs. This tends to be a particular requirement for probes having arcuate movement, but machines other than probes and machines having non-arcuate movement may also require calibration.

It is known to calibrate co-ordinate measuring machines by using a machine checking gauge supplied by Renishaw plc and substantially as illustrated in FIG. 10 of British Standard 6808 Part 3, 1989. This gauge comprises a base having a tower on the end of which is mounted one end of an arm which is freely movable angularly but which is fixed lengthwise. A touch trigger probe is mounted on a co-ordinate measuring machine to be calibrated, and is fitted with a stylus which runs in a fork at the free end of the arm of the gauge. The co-ordinate measuring machine is operated to move the probe (and with it the gauge arm) to various angles around the top of the gauge tower, and at each angle approach the top of the tower to take a touch-trigger reading. The lengthwise fixing of the gauge arm means that all the points reached by the stylus tip at the limit of its inward movement will be on a common sphere having a radius set by the length of the gauge arm and a centre at the pivot at the top of the gauge tower. The co-ordinate measuring machine's scale readings for each of these points can be compared to assess volumetric errors in its operation.

However, this method is used only to calibrate a co-ordinate measuring machine. Insofar as the probe can be seen as part of the co-ordinate measuring machine, all the signals which are compared in the calibration process come from within the machine and none come from an independent calibration apparatus. Insofar as the probe is seen as separate from the co-ordinate measuring machine, the method calibrates the machine and not the probe, and the method assumes that the probe is itself accurate and well-calibrated. The method is disclosed only in terms of using a touch-trigger probe.

In WO 88/06714 a calibration arrangement is disclosed for a machine in which relative movement takes place between two parts of the machine, to position a machine tool or a touch trigger probe relative to a workpiece. The machine includes means to move the tool or probe and scales to measure the movement along three axes. In the calibration arrangement the true position of the tool or probe is measured by reflecting a laser beam from it. The scales are calibrated by moving the tool or probe along the line of the laser beam towards or away from the laser, and comparing the scale position output signals with the true tool or probe position as measured by the laser beam. Calibration errors may be stored in an error map. The laser beam may be directed along the X-axis direction or the Y-axis direction or along a diagonal. With this calibration arrangement, the measurement axes are defined by the scales and cannot be determined by the calibration operation. Equally, there is no suggestion of using the calibration arrangement on a device which does not define its own axes. Additionally, it is necessary to move the laser system between calibration movements, as the movement must be along the line of the laser beam. Therefore the movements of the tool or probe cannot be accurately calibrated with reference to a common datum position defined by the calibration apparatus.

For accurate measurement with probes which have a construction such that the stylus may move off axis in X and Y directions, the best results may not be achieved if the probe is calibrated simply by displacing the stylus tip along a path which follows the X-axis for calibration of the measurement signals for the X co-ordinate and along the Y-axis for measurement signals which calibrate the Y co-ordinate. Therefore the calibration exercise should take into account a two dimensional movement of the stylus tip during the calibration exercise so that both the X and Y co-ordinates may each be calibrated for any position of the stylus tip in the XY plane. Such a calibration exercise will have a greater or lesser value depending on the non-linearities of the probe output.

According to another aspect of the invention there is provided a method of calibrating a continuous measuring probe having a stylus capable of displacement in at least two dimensions, comprising the steps of:

a) obtaining a series of probe data from the probe at a plurality of positions of the stylus, b) obtaining a corresponding series of positional data for said plurality of positions independently of the probe, and c) comparing the probe data and the positional data so as to obtain calibration parameters for correction of probe data to corrected probe position data, characterised in that the said plurality of positions comprises first and second points which define a line, and a third point offset from the line, and the positional data which is obtained for each of the first, second and third points defines the position of the probe relative to a common datum.

Preferably the plurality of positions comprises a fourth point offset from each of the line defined by the first and second points, the line defined by the first and third points and the line defined by the second and third points, and the positional data which is obtained for the fourth point defines the position of the probe relative to the said common datum.

Thus the calibration can take account of the probe data from a plurality of points not all on the same straight line, and the position of the probe at all of these points can be referred to a common datum and so can be calibrated relative to a common reference point. Preferably the probe moves through the positions along a curved path.

According to another aspect of the present invention there is provided a method of calibrating a continuous measuring probe having a stylus capable of displacement in at least two dimensions, comprising the steps of:

a) obtaining a series of probe data from the probe at a plurality of positions of the stylus, b) obtaining a corresponding series of positional data for said plurality of positions independently of the probe, and c) comparing the probe data and the positional data so as to obtain calibration parameters for correction of probe data to corrected stylus position data, characterised in that the corrected stylus position data defines the position of the stylus with respect to a reference axis in an XY plane the direction of which reference axis in the plane is determined by the positional data independently of any reference axis in the XY plane for the probe data.

According to another aspect of the present invention there is provided a method of calibrating a continuous measuring probe having a stlys capable of displacement in at least two dimensions, comprising the steps of:

a) obtaining a series of probe data from the probe at a plurality of positions of the stylus, b) obtaining a corresponding series of positional data for said plurality of positions independently of the probe, and c) comparing the probe data and the positional data so as to obtain calibration parameters for correction of probe data to corrected stylus position data, characterised in that the calibration parameters provide parameters for one or more conversion functions for converting probe data to said corrected stylus position data.

The functions may comprise one or more polynomials for which the calibration parameters provide co-efficients. The polynomials may include second or higher order terms in the probe data. The co-efficients may be determined in stages in which values are determined for some co-efficients only while others are held constant.

According to another aspect of the present invention there is provided a method of calibrating for X and Y axis displacement a continuous measuring probe having a stylus capable of displacement in at least the X,Y plane comprising the steps of obtaining a series of probe data from probe output signals at given positions of the stylus, obtaining a corresponding series of positional data for said given positions independently of the probe output signals, performing a correlation between the probe data and the positional data so as to obtain calibration parameters for correction of measurement signals, and adapting a measurement function for use in measurement operations to incorporate said calibration parameters, whereby in subsequent measurement operations the probe output signals are processed to produce corrected measurement signals.

In an embodiment of the method, calibration is accomplished by placing the probe on a form measuring machine with a workpiece turntable and outputting a series of transducer signals from the transducers for processing so as to establish values for calibration parameters in calibration functions. This calibration is specifically directed to the X,Y plane of measurement of the probe. Where the probe will be mainly employed for form measurement, it is the displacement of the stylus tip in the X,Y (two dimensional) plane which is normally of greatest importance.

According to a further aspect of the present invention there is provided a method of calibrating a measuring probe for the output of corrected X and Y axis measurement signals representing displacements of a stylus of the probe in X and Y axis directions respectively, a said form measuring probe comprising: the stylus, so mounted relative to a probe housing as to permit two dimensional displacement of the stylus; and sensors responsive to said stylus movement to output sensor signals related to said stylus displacement, said calibration enabling said output of corrected measurement signals derived from said sensor signals, wherein the calibration of said probe comprises the steps of arranging the probe in a predetermined position relative to displacement means for displacing the stylus (within the operating range thereof) along a defined path, actuating the displacement means to displace the stylus along said defined path, gathering as sensor data the sensor output signals of each sensor for each of a series of discrete measurement positions of the stylus, gathering positional data giving the measurement position of the stylus for each of said discrete measurement positions, performing a correlation between the sensor data and the positional data so as to obtain calibration parameters for correction of the measurement signals, and, storing said calibration parameters in such manner that during subsequent measurement operations the sensor output signals are processed to produce said corrected measurement signals.

In a preferred embodiment the displacement means is actuated to displace the stylus along said defined path in discrete steps, discrete measurement positions being determined by said discrete steps.

In the alternative, the displacement means may be actuated to displace the stylus along said defined path and the discrete measurement positions may be defined by the locations at which the sensor data is gathered. In an embodiment, in which the stylus is displaced along a series of concentric circles, the displacement means movement may be continuous along a circular path and the sensor data gathered at discrete locations along that path, a discontinuity in stylus movement occuring when the radius of rotation is adjusted for the next circular path in the series of concentric circles.

By arranging for the stylus to describe a circle about the centre of rotation of the turntable of a form measuring machine (as in a preferred embodiment), the position of the stylus relative to the centre of rotation may be accurately determined. It will be appreciated that the radius of rotation R and the angle of rotation $\theta$ enables the X,Y co-ordinates for any given measurement position to be calculated. It will be recognised that X=R SIN $\theta$ and Y=R COS $\theta$.

Thus, for a given series of movements of the stylus, the sensor output signals are obtained (and translated into dimensional signals) and these sensor output signals are compared mathematically with the X,Y co-ordinates computed from the measured positional data for the radius of rotation R and the angle of rotation $\theta$. Using known techniques it is possible to convert the sensor output signals from analogue signals to digital signals and to scale these digital signals so as to correspond to a given measurement range. For example, a sensor output signal over a range of operating movement of the probe stylus tip corresponding to a radial displacement of $\pm 2$ mm may be scaled to be the equivalent of $\pm 10,000$ bits of a digital output signal. In the embodiment algorithms have been presented in which there are a number of calibration parameters. These are required in order that the (scaled and digitised) sensor output signals can be processed to give dimensional measurement signals. The corrections take account of the actual movement of the stylus tip in the X,Y plane and characteristics of the probe and sensors which might otherwise distort the measurement signals.

The values of X,Y co-ordinates are calculated from expressions in which constants (parameters) are determined by correlation of probe data and (measured) positional data. This applies irrespective of the number of probe sensors.

Assume that the probe has a plurality of sensors with sensor output signals $t_1 \ldots t_n$. In the correlation step, the values for the X,Y co-ordinates for each measurement position are derived from the positional data and are employed to derive calibration parameters for the expressions $X = f_1(t_1 \ldots t_n)$ and $Y = f_2(t_1 \ldots t_n)$, where the functions $f_1$ and $f_2$ contain the calibration parameters.

In a described embodiment of the probe, the probe has sensors associated with an axis designated the probe X-axis with sensor output signals $X_1$, $X_2$ and sensors associated with an axis designated the probe Y-axis with sensor output signals $Y_1$, $Y_2$. In this case, the values for the X,Y co-ordinates for each measurement position are derived from said positional data and are employed to derive calibration parameters for the expressions $X = f_1(X_1, X_2, Y_1, Y_2)$ and $Y = f_2(Y_1, Y_2, X_1, X_2)$, where the functions $f_1, f_2$ contain the calibration parameters.

In another embodiment, the probe has three equi, angularly arranged sensors with output signals $t_1$, $t_2$, $t_3$. In this case, the values from the X,Y co-ordinates for each measurement position are derived from positional data and are employed to derive calibration parameters for the expression $X = f_1(t_1, t_2, t_3)$ and $Y = f_2(t_1, t_2, t_3)$, where the functions $f_1$, $f_2$ contain the calibration parameters.

In either case, the functions $f_1, f_2$ may each be calculated as the product of a first measurement expression and a second compensating expression derived from sensor outputs, the first measurement expression being associated with the measurement axis, and the second compensating expression being associated with the axis orthogonal to the measurement axis to compensate for variations in the sensor data being due to non-axial movement of the probe.

For the probe with the sensor output signals $X_1, X_2, Y_1, Y_2$ the measurement expression for the X co-ordinate can be defined by $(A_1 \cdot X_1 + A_2 \cdot X_2 + B_1 \cdot X_1^2 + B_2 \cdot X_2^2 + C_1)$ wherein $A_1, A_2, B_1, B_2$ and $C_1$ are calibration parameters, and this can be multiplied by the compensating expression which can be expressed as $(D_1 \cdot Y_1 + D_2 \cdot Y_2 + E_1 \cdot Y_1^2 + E_2 \cdot Y_2^2 + G_1)$ wherein $D_1, D_2, E_1, E_2$ and $G_1$ are calibration parameters. Similar expressions for the Y co-ordinate are given hereinafter.

For the probe with sensor output signals $t_1$ to $t_3$, for the X co-ordinate the measurement expression can be defined by $(A_1 t_2 + A_2 t_3 + B_1 t_2^2 + B_2 t_3^2 + C_1)$ in which $A_1, A_2, B_1, B_2$ and $C_1$ are calibration parameters and this can be multiplied by the compensating expression which can be expressed as $(D_1 t_1 + D_2 t_3 + E_1 t_1^2 + E_2 t_3^2 + G_1)$ where $D_1, D_2, E_1, E_2$ and $G_1$ are calibration parameters. For the Y co-ordinate the respective expressions are $$(A_3 \cdot t_1 + A_4 \cdot t_3 + B_3 \cdot t_1^2 + B_4 \cdot t_3^2 + C_2)$$

where $A_3, A_4, B_3, B_4$ and $C_2$ are calibration parameters and $$(D_3 \cdot t_2 + D_4 \cdot t_3 + E_3 \cdot t_2^2 + E_4 \cdot t_3^2 + G_2)$$

where $D_3, D_4, E_3, E_4$ and $G_2$ are calibration parameters.

As aforesaid, the positional data is derived from the expressions $X = R(\sin \theta)$ and $Y = R(\cos \theta)$, wherein R is the said radial distance of the stylus tip from the rotational axis and $\theta$ is said angular displacement. The correlation may compensate for set-up errors in the position of the probe relative to the rotational axis. Such errors may be taken into account by the calibration parameters $C_1$, $C_2$ which represent an allowance for eccentricity of the probe, $dR_1$, $dR_2$ as offsets in the radial distance R and $d\theta_1$, $d\theta_2$ as offsets in the angular displacement $\theta$. By determining the values of $dR_1$, $dR_2$ and $d\theta_1$, $d\theta_2$ in the expressions $X = (R + dR_1) \cdot \sin(\theta + d\theta_1)$ and $Y = (R + dR_2) \cdot \cos(\theta + d\theta_2)$, compensation is effected.

The reason for two offset parameters $dR_1$, $dR_2$ is that two correlations are performed, one for each of the X,Y axes: comparison of the two values $dR_1$, $dR_2$ enables a further check to be made on the accuracy of calibration (as further described in the preferred embodiment).

According to another aspect of the present invention there is provided calibration apparatus for calibrating a continuous measuring probe, the apparatus comprising movement means to move a stylus tip of a probe in a XY plane and provide position signals in accordance with the position to which the stylus tip is moved, mounting means to mount the probe relative to the movement means, and means to receive the said position signals and signals from the probe and determine therefrom calibration data for calibrating the signals from the probe in accordance with the said position signals, the movement means being operable to move the stylus tip through a plurality of points on the XY plane including first and second points defining a straight line and a third point offset from the straight line, and to provide in respect of each of said first, second and third points a said position signal which indicates the position of the stylus tip relative to a common datum.

According to a further aspect of the present invention there is provided apparatus for calibrating a measuring probe for the output of corrected X and Y axis measurement signals representing displacements of the probe in X and Y axis directions respectively, said measuring probe comprising a stylus, so mounted relative to a probe housing as to permit two dimensional displacements of the stylus, and sensors responsive to said stylus movement to output sensor signals related to stylus displacement, said calibration enabling said output of corrected measurement signals derived from said sensor signals, the apparatus comprising means for arranging the probe in a predetermined position relative to displacement means for displacing the stylus along a defined path, said displacement means being operable to displace the stylus along said defined path, means for outputting as sensor data the sensor output signals of each sensor for each of a series of discrete measurement positions of the stylus, means for outputting positional data giving the measurement position of the stylus for each of said measurement positions, means for performing a correlation between the sensor data and the positional data so as to obtain calibration parameters for correction of the measurement signals, and means for storing said calibration parameters in such manner that during subsequent measurement operations the sensor output signals are processed to produce said corrected measurement signals. The arranging means may be provided by the probe carrying arm of a form measuring machine. The displacement means may be provided by the rotary workpiece turntable of the form measuring machine. Guide means may be arranged on said rotary turntable and adapted for contact with a stylus tip of a said probe stylus. The arrangement is such that, upon rotation of the turntable, the stylus tip is displaced along a defined path. The positional data of the measurement positions will then be determined by the radius of rotation R of the stylus tip and the angular displacement $\theta$ thereof.

In an embodiment, the guide means are associated with a slide block such that the guide means are displaceable to vary said radius of a rotation R. In this case, incremental variations in the radius of rotation R are determined by the insertion of slip blocks.

In the alternative, the turntable may have centring means associated therewith for displacement thereof along its X and Y axes.

An angular encoder may be associated with the displacement means so as to provide measurement signals for discrete angular displacements thereof.

Applicants themselves market a form measuring machine known by the trade name TALYROND 300 which exemplifies such a machine. This machine is provided with a centring turntable whereby the position of a workpiece can be translated along X and Y axis of the turntable by increments of 1.0 micrometers ($\mu$m). Such a machine enables guide means placed on the workpiece table to be displaced so as to increment the radius of rotation of the stylus tip about the axis of rotation of the workpiece table.

An advantage of the preferred embodiment of the calibration method is that the stylus is carried to positions spaced by at least 180° around the stylus equilibrium position without the calibration apparatus losing contact with the stylus.

According to another aspect of the present invention there is provided guide means for receiving and guiding a stylus of a continuous measuring probe during a calibration operation in which the stylus is moved through a plurality of positions displaced from its rest position, the guide means comprising a pair of abutments positioned relative to each other so that both abutments simultaneously contact the stylus and locate a stylus pressed against them, the guide means being positioned in use with the abutments aligned with each other in a direction transverse to the direction in which the stylus is displaced from its rest position so that the force tending to return the stylus to its home position drives the stylus against the abutments.

According to a further aspect of the invention there is provided guide means for use in the calibration of a measuring probe having a stylus with a stylus tip, the guide means comprising a pair of abutments (for example, fixed needle bearings) so arranged and spaced as to receive therebetween in kinematic contact therewith the stylus tip of a probe being calibrated.

The embodiments also disclose a stylus assembly with a removably mounted stylus which facilitates stylus replacement without necessitating re-calibration.

BRIEF DESCRIPTION OF THE DRAWINGS

Embodiments of the invention will now be described, by way of example only, with reference to the accompanying drawings, in which :

FIG. 1 shows an elevation, mainly in section, of a first embodiment of a measuring probe which includes a housing and a stylus assembly;

FIG. 2 shows an exploded perspective view of the probe of FIG. 1 with the stylus removed;

FIG. 2A shows the shape of the ligament springs of FIGS. 1 and 2;

FIG. 3 shows a section taken on the line A—A of FIG. 1;

FIGS. 4 and 5 are plan views of separable parts of the stylus assembly;

FIG. 8 shows in elevation, mainly in section, a measuring probe according to another embodiment also having a housing and including a stylus assembly;

FIG. 10 shows a section taken on the line AA of FIG. 8;

FIGS. 12 and 13 show plan views of separable parts of the stylus assembly of FIG. 8.

FIG. 16 shows an end view at the level of line XVI—XVI in FIG. 15;

FIG. 17 shows a combined diaphragm and pre-load spring;

FIG. 18 shows schematically how the combined spring of FIG. 17 could be used;

FIG. 19 shows in perspective a view of part of a calibration machine according to an embodiment with an inset plan view of guide means for use with the calibration apparatus.

DETAILED DESCRIPTION OF THE PREFERRED EMBODIMENTS

Figure 6:
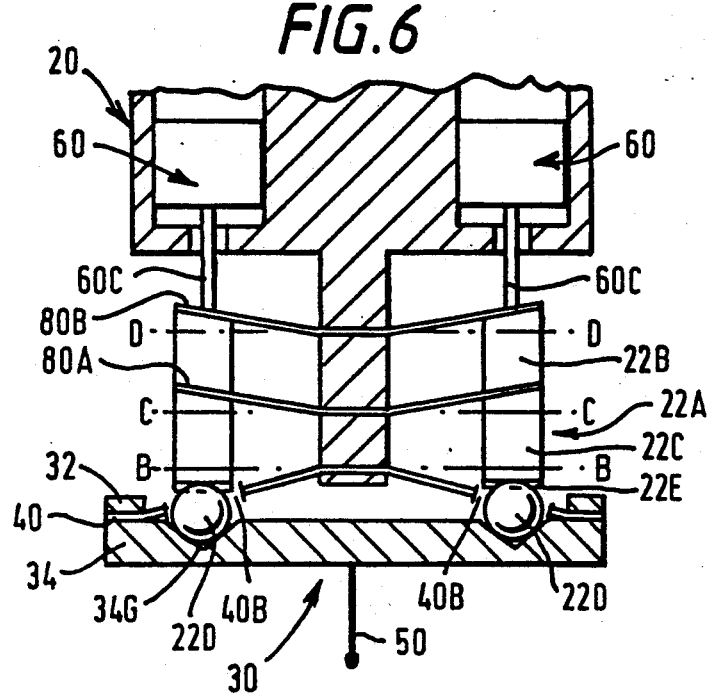
FIG. 6 is a schematic view of a modification to the probe of FIG. 1.

In FIGS. 1 to 5 of the drawings there is shown a measuring probe 10, for form or size measurement in conjunction with a measuring machine. The probe 10 comprises a housing 20, a stylus mount or assembly 30 including a resilient diaphragm spring 40 by which a stylus 50 is mounted on the housing 20 for movement in the orthogonal X, Y, Z directions. This stylus movement is not translational but is arcuate in the XY plane, i.e. XY movement of the stylus tip is achieved by tilting the stylus.

Four transducers 60 (only two of which are shown in FIG. 1) mounted in the housing 20 and four linkages 70 connect the stylus assembly 30 to the transducers 60 so that the transducers 60 produce electrical signals dependent on the movement of the stylus assembly 30 relative to the housing 20. Stylus assembly 30 enables the stylus 50 to be mounted on the diaphragm 40 such that any movement of the stylus 50 is transmitted (as will be explained) to the transducers 60.

The stylus assembly 30 comprises a mounting ring 32 and a mounting plate 34 clamping the diaphragm 40 at its periphery. The diaphragm 40 is centrally attached to the housing 20. As seen from FIG. 2, the mounting ring 32 has a peripheral wall 32A and a lower radially extending face 32B. The mounting plate 34 comprises an upper portion 34A for clamping the diaphragm 40 against the face 32B of the mounting ring 32, and a reduced diameter portion 34B with a peripheral wall 34C on which there are mounted four clamp adjusters 36. On the underface 34D of the mounting plate there is a magnet 38 and spherical elements (e.g. ball bearings) 39 for locating the stylus 50. The stylus 50 comprises the locator plate 52 from which the stylus stem 54 depends to the stylus tip 56 which contacts a workpiece for measuring purposes.

As will be seen from FIGS. 4 and 5 the ball bearings 39 of the mounting plate 34 align with location grooves 58 on the locator plate 52 of the stylus 50. The stylus 50 is demountable from the stylus assembly 30 and it is held in place when in position by the magnet 38. The ball bearings 39, which are fixed to the mounting plate 34, are dimensioned such that there is an air gap between the magnet 38 and the top of the stylus locator plate 52. The arrangement is such that if the stylus 50 meets undue force or an obstruction in the XY directions it can self-release from the mounting plate 34: this occurs when mounting ring 32 abuts the housing 20, which forms a stop limiting tilt (and also upward axial movement) of the stylus assembly 30. This arrangement ensures that any one stylus will accurately repeat its fitted position when removed and relocated, thereby avoiding re-calibration.

It will be noted that the ball bearings 39 and location grooves 58 are equiangularly spaced at angles of 120°.

It will be noted from FIG. 2 that the mounting ring 32, diaphragm 40 and mounting plate 34 are each provided with assembly apertures 32E, 34E and 40E respectively for their connection by connectors not shown.

The housing 20 is adapted at its lower end for the mounting of the diaphragm 40 and thereby the stylus assembly 30. For this purpose it has a downwardly protruding central boss 20A which protrudes from a radially extending lower face 20B (which provides the aforementioned stop}of the main housing core which is made up of parts 20C, D and E. The diaphragm 40 is centrally clamped to the housing boss 20A by means of a fixing member 24 which has driving apertures 24A. The respective dimensions of the housing boss 20A and the mounting ring 32 in the axial direction of the probe are such that as can be seen from FIG. 1 there is a gap between the top of the mounting ring 32 and the housing face 20B, this gap accommodating the measuring range of movement of the stylus assembly 30. As aforesaid, if the stylus assembly 30, over travels upon meeting an obstruction in an XY direction, the face 20B acts as a limit stop and the stylus 50 self-releases. The face 20B also acts as a limit stop for upwards Z travel, but in this case the stylus 50 does not self-release.

The housing 20 is further configured so as to provide a central bore 25 for a connector rod 26 to which the fixing member 24 is attached. The connector rod 26 extends through the housing thereby to align the parts, and is secured by a nut. The housing 20 is further configured to provide chambers 27 for the rigid linkages 70 and chambers 28 for the transducers 60. It is best seen from FIG. 3 that the housing part 20C with its lower face 20B has a cruciform configuration in which the four linkage chambers 27 are regularly spaced. The linkage chambers 27 have a rectilinear configuration with an inner wall 27A, outwardly directed walls 27B, walls 27C parallel to the wall 27A, and further outwardly directed walls 27D extending to the perimeter of the housing where the chamber 27 opens outwardly from the probe. The chambers 27 are formed by recesses in each of the housing parts 20C, D and E which are contiguous. These three housing parts 20C, D and E clamp between them a pair of plate springs or ligaments 80A, 80B, shaped as shown in FIG. 2A.

The lowermost ligament 80A is clamped centrally between the housing parts 20C and 20D. The ligament 80A has an annular portion, which is clamped between the axial end faces of those housing parts 20C, D, and outwardly and radially projecting limbs 80C, (FIG. 3) which have a configuration akin to leaf springs, and leaves 80D. Leaves 80D are also regularly spaced, but offset with respect to the limbs 80C, so as to be clamped between the housing parts 20C, D in those portions thereof which extend to the perimeter as viewed in FIG. 3. The ligament 80B is of similar configuration to the ligament 80A and it is mounted between end faces of the housing parts 20D and 20E. The pair of ligaments 80A, 80B have several functions, one of which is to bias the rest position of the stylus assembly 30, and another of which is to act as guide means for ensuring linear movement of connection means (to be described) between the stylus assembly 30 and the transducers 60, and yet another of which is to place wires 22 under tension thereby prestressing the diaphragm 40.

The transducers 60 are mounted in four equiangularly spaced bores 20G in the housing part 20E. The transducers 60 comprise coils 60A and armatures 60B carried on armature carriers 60C which extend through passageways 20H in the housing part 20E so as to communicate with the linkage chambers 27. Tensioned wires 22 extend from the mounting plate 34, to which they are clamped by the clamp adjusters 36, to the armature carriers 60C to which they are connected at 60D (FIG. 1). Rigid linkages 70 clamp together the pair of ligaments 80A, 80B and are fixedly attached to the armature carrier 60C. It will be seen that the linkages 70 each comprise four parts 70A, B, C and D which are rigidly connected together by connector means (a threaded bolt) 70E (FIG. 2). The parts 70A and B clamp the limbs 80C of the ligament 80B and the parts 70C, D clamp the limbs 80C of ligament 80A. The linkage part 70C carries the means of connection to the armature carrier 60C. As stated, this connection between the rigid linkage 70 and the armature carrier 60C is rigid such that movement of the stylus assembly 30 which is transmitted to the armature carrier 60C by the tensioned wire 22 is also transmitted to the rigid linkages 70 and the ligaments 80A, 80B. As will be understood, the transducers 60 have wiring (not shown) which extends through the upper part of the bores 20G so that the signals of the transducers can be processed by the measuring machine.

The construction of this probe with its stylus assembly 30 mounted by means of the diaphragm 40 and connected by means of the tensioned wires 22 to the ligaments 80A, 80B is such that, in the rest position of the stylus 50, the ligaments 80A, 80B and the diaphragm 40 and the wires 22 are all pre-tensioned. In the drawing FIG. 1 the relaxed (i.e. unstressed) positions of the diaphragm 40 and the pair of ligaments 80A, 80B are indicated by the lines B, C and D respectively. By the use of the tensioned wires 22 (one for each transducer and each limb 80C) the diaphragm 40 and the ligaments 80A, 80B are held in their FIG. 1 positions in which they are prestressed. The rest position of the stylus assembly 30 and thereby the stylus 50, is the position in which the opposed resilient members, namely the diaphragm 40 and the pair of ligaments 80A, 80B establish an equilibrium position. In that position the resilient forces exerted by the ligaments 80A, 80B and the resilient forces exerted by the diaphragm 40, which are opposed, are in balance. This means that the rest position of the stylus assembly 30 is one in which the stylus assembly 30 is resiliently held in a position from which it can be displaced in any direction.

From FIG. 3 it will be noted that connectors 29 pass through the housing parts 20C, D and E in the regions of the lands thereof which bound the linkage chambers 27 to clamp the parts together in rotational alignment. It will also be noted that the rigid linkages 70 are held in alignment by means of alignment pins 70F which are arranged in parallel on either side of the connectors 70E.

It should be noted that the tensioned wires 22 pass within the aperture defined by the mounting ring 32 and through apertures 40A in the diaphragm and 34F in the mounting plate (FIG. 2). The apertures 34F are aligned with the clamp adjusters 36 whereby at the setting up stage the length of tensioned wire 22 can be adjusted so as to prestress the ligaments 80A, 80B and the diaphragm 40: this is achieved by placing a spacer block (not shown) in the linkage chamber 27 above the rigid linkage 70 and a further spacer block (not shown) below the rigid linkage 70 and forcing the mounting ring 32 into contact therewith. This ensures that the correct length of the tensioned wire is determined. The spacer blocks are then removed.

In the probe of FIGS. 1 to 5 the stylus is typically 100 mm in length and has a maximum displacement in the XY directions of ±2 mm at the stylus tip 56.

The gauging force in the Z direction may be made substantially greater than the gauging force in the X,Y directions, which is advantageous for form measurements carried out on roundness measuring instruments.

The probe 10 of FIG. 1 has the stylus assembly 30 attached to the perimeter of the diaphragm 40, the diaphragm 40 is centrally attached to the housing 20, and the tensioned wires 22 prestress the ligaments 80A, 80B and the diaphragm 40 placing them under tension such that they act resiliently to pull the stylus assembly 30 in opposite directions whereby the rest position of the stylus 60 is at the position in which the opposed forces are in equilibrium.

The latter feature of having the opposed forces in equilibrium at the rest position so as to have a resiliently suspended stylus 50 provides a number of practical advantages. In particular, the trade-off between frequency response on the one hand and the accuracy and repeatability of the probe on the other hand is found in tests to be good in comparison with current multiaxis probes.

This advantageous trade-off arises because the opposed forces enable stable and reproducible movement of the stylus to be obtained with a two-dimensional (XY) arcuate (tilting) pattern of movement. Arcuate movement can be achieved with small movable components with a low inertia, leading to an improved frequency response. The use of a pre-stressed diaphragm spring to support the stylus mount is especially advantageous in this respect.

Modifications of the probe of FIG. 1, which meet the same design criteria, are illustrated schematically in FIG. 6, 7 in which like parts have like references.

In the modification of FIG. 6, the ligaments 80A, 80B together with the armature carrier 60C, and the stylus assembly 30 are not connected by a tensioned wire 22 but instead by rigid connections 22A (four of them equally spaced as with the tensioned wires 22) comprising the links 22B,C acting on spherical elements (e.g. bearings) 22D which, in turn, sit fixedly in a circumferential groove 34G in mounting plate 34. The link 22C has a radial groove 22E for seating bearing 22D. The radial and circumferential grooves 22E and 34G ensure accurate and automatic positional location for bearings 22D. The diaphragm 40 again is mounted centrally relative to the housing 20 and clamped at its periphery to the stylus assembly 30 by the mounting ring 32 and the mounting plate 34. In order to accommodate this form of rigid connection, diaphragm 40 has apertures 40B through which the bearings 22D can extend freely without encroaching on the active part of the diaphragm 40. This embodiment exhibits the aforementioned resilient suspension of the stylus assembly 30 but with the ligaments 80A, B and diaphragm 40 exerting compression forces.

Figure 7:
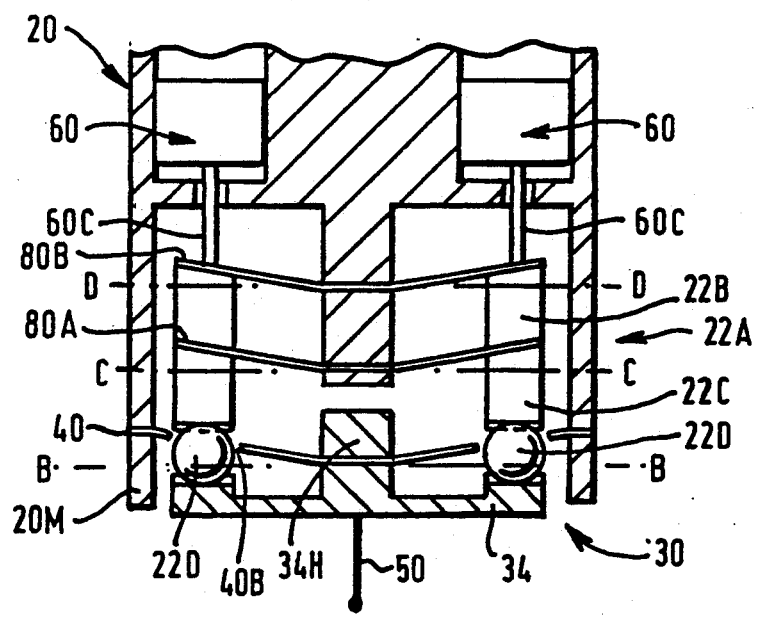
FIG. 7 is a schematic view of another modification of the probe of FIG. 1.

The modification of FIG. 7 is similar to that of FIG. 6 in terms of the rigid links 22A between the ligaments 80A, B and the stylus assembly 30. The difference is that the diaphragm 40 is centrally mounted relative to the stylus assembly 30 which now comprises a modified mounting plate 34 (without a mounting ring 32). This mounting plate 34 has a central boss 34H to which the diaphragm 40 is attached (in similar manner to the central attachment of the diaphragm 40 to the housing 20 in the embodiment of FIG. 1). The connection between the diaphragm 40 and a depending outer casing 20M of the housing 20 is at the periphery of the diaphragm 40 as shown. Again the rest position is determined by the oppositely acting resilient means, namely the diaphragm 40 and the ligaments 80A, B which in this embodiment exert compression forces. In both FIG. 6 and FIG. 7 the unstressed positions of the ligaments 80A and 80B and the diaphragm 40 are again illustrated by lines B, C and D.

In another arrangement, not illustrated, the diaphragm 40 and the ligaments 80A, 80B are connected as shown in FIG. 7, but the diaphragm 40 extends downwardly and outwardly as in FIG. 6. In this arrangement, to provide the force in the correct direction from the diaphragm 40, its rest position is not planar but is conical with a steeper cone angle than the angle it adopts under the action of the ligaments 80A, 80B.

From the aforegoing, it will be plain that resilient suspension of the stylus can be arranged in a number of different ways other than those illustrated by making use of tension or compression forces which maintain a form of suspension of the stylus in which the stylus rest position is determined by opposed resilient bias means. Likewise, the manner of mounting the diaphragm to the housing, and the diaphragm to the stylus assembly affords a reversible choice of which employs a central mounting and which employs a peripheral mounting. It will be apparent that the advantages of the FIG. 1 embodiment can be obtained with such modified embodiments.

FIGS. 8 to 13 show a second embodiment of a probe for multiaxis form or size measurement for use with a measuring machine in which the probe signals and the machine signals are utilised to provide form measurement data for use in measuring workpieces. This probe 110 comprises a housing 120, a stylus assembly 130, a resilient diaphragm 140 by which the stylus assembly 130 (including a stylus 150) is mounted on the housing 120 for movement in the X, Y, Z directions, three transducers 160 (shown in FIG. 10) mounted in the housing 120 and directly connected in the stylus assembly 130 so that the transducers 160 produce electrical signals dependent on the movement of the stylus assembly 150 relative to the housing 120.

In the stylus assembly 130, the stylus 150 is releasably connected to a mounting plate 134. The diaphragm 140 is peripherally clamped between a mounting ring 132 and the mounting plate 134. The mounting plate has a peripheral wall 134A (see FIG. 11) upstanding from a lower plate 134B and which supports a median member 134C. At three peripherally equi-spaced locations the peripheral wall 134A supports integral bosses 134D (FIG. 8) which receive connector members 134E, which in turn are threadedly received in the mounting ring 132 to couple together the mounting plate 134 and the mounting ring 132 to clamp the diaphragm 140. Bosses 134D extend in the axial direction from the median member 134C to the top of the peripheral wall 134A. The median member 134C has apertures 134F to enable it to move relative to sleeves 160G in which the transducers 160 are housed: each sleeve 160G depends from an insert 120H and has an internal portion on which the transducer coil 160A is mounted. These apertures 134F are equiangularly spaced. The median member 134C on its underside carries a magnet 134H which holds releasably the stylus 150. The median member 134C is further provided with contact elements (e.g. roller bearings) 134J which are fixedly arranged in equiangularly spaced, radially extending locator grooves 134K (FIG. 12). The stylus 150 comprises a locator plate 150A on which at three equiangularly spaced locations pairs of spaced spherical elements (e.g. ball bearings) 150B are fixedly mounted. The spacing (FIG. 13) between the ball bearings 150B of a pair of ball bearings is such that the ball bearings engage with the roller bearings 134J of the mounting plate 134 so as to radially and axially align the stylus 150 with the mounting plate 134. The ball bearings 150B are fixed relative to the locator plate 150A. The stylus further comprises the stem 150C and the stylus tip 150D.

The lower plate 134B of mounting plate 134 has a central circular recess 134L (FIG. 9) which has an axially extending edge 134M defining an aperture to receive the locator plate 150A of the stylus 150. Further recesses 134N defining axially extending edges 134P communicate with the circular recess 134L so as to define in the material of the lower plate 134B lobes 134Q. The lobes 134Q have at their radially inner extremity the edges 134M. The lobes 134Q are aligned with the apertures 134F for the transducers and these lobes 134Q are provided with axial bores 134R for mounting the transducer armature carrier 160C (to be further described).

The mounting ring 132 has a peripherally extending outer wall 132A and three equiangularly spaced capture members 132B (illustrated in FIG. 9) which are of a configuration such as to provide, by means of a respective bore 132C, a cup-like figuration for receiving one end of a respective compression spring 180. Recesses 132D leading to bores 132E are provided to threadedly receive the connectors 134E coupling together the mounting plate 134 with the mounting ring 132 and thereby clamping the diaphragm 140. The diaphragm 140 has assembly apertures 140M for the passage of the connector members 134E and transducer apertures 140B which enable it to move relative to the sleeves 160G. A mounting member 124 is arranged to connect the stylus assembly 130 to the housing 120. It is in the form of a stud which passes through a central aperture 140C in the diaphragm 140 and which threadedly engages a bore 120A (FIG. 9) in a boss 120B which downwardly extends from the main core 120C of the housing 120. The housing main core 120C has a lower surface 120D in which there are transducer bores 120E and locator bores 120F which accommodate the compression springs 180. Turning to FIG. 8 it will be seen that the locator bores 120F threadedly locate adjustable studs 120G for adjusting the compression of the compression springs 180. The transducer bores 120E threadedly receive transducer inserts 120H which provide passageways for wiring associated with the transducers 160 whereby the output of the transducers 160 may be connected to the data gathering equipment. The transducer sleeves 160G are attached fast in recesses in the inserts 120H and support transducer coils 160A. The transducers themselves comprise a coil 160A, an armature 160B, each armature being carried on an armature carrier 160C. The armature carrier 160C is directly and fixedly connected to the mounting plate 134 at the respective bore 134R.

The main core 120C of the housing further comprises an upstanding boss 120J which has a central bore 120K to receive a connector member (not shown) for connecting the probe housing to a measuring machine. The housing further comprises a top plate 120L which seals the interior of the housing and has a depending skirt 120M to guide it into an outer casing 120N surrounding the main core. A bore 120T threadedly connects the top plate with the aforesaid connector member. The outer casing 120N is substantially cylindrical but has a radially inwardly directed flange 120R at the level at which the stylus locator 150A is arranged (see FIG. 8). The housing casing flange 120R supports an annular disc 120S which completes the lower side of the housing casing.

This probe 110 has the characteristic in common with the earlier embodiments that the stylus assembly 130, and thereby the stylus 150, is mounted in such manner that the rest position of the stylus, that being the position to which it returns when released from any contact, is determined by the equilibrium position of the mounting assembly in accordance with the balancing of opposed forces of the diaphragm 140 and the compression springs 180. The compression of the springs 180 can be adjusted by means of the adjustable studs 120G. The diaphragm, which in an unstressed state would be aligned with the plane B (FIG. 8), is prestressed by virtue of the fact that it is clamped at its centre by the mounting member 124 in plane B and it is clamped at its perimeter between the mounting plate 134 and mounting ring 132 at a different level. It therefore acts owing to its deflection to provide a force opposing the force provided by the compression springs 180, thereby to determine an equilibrium position of the suspended mounting assembly 130, which determines the rest position for the stylus 150. Movement of the armature carrier 160C in response to any displacement of the stylus 150 is not entirely linear with respect to the transducer 160. The non-linearity components can be compensated for in the calibration. The outputs of the three transducers are calibrated so as to obtain the X, Y and Z measurements. The use of three transducers instead of four affords a reduction in the number of electronic channels through which the transducer signals must pass and therefore facilitates a reduction in the associated electronics.

As in the embodiment of FIGS. 1 to 5, this embodiment has a stylus 150 which by virtue of the location means (shown in FIGS. 12 and 13) is removably connected to the mounting plate 134 where it is held by means of the magnet 134H but from which position it is displacable or replacable. This feature enables the stylus to become displaced if it inadvertently strikes a workpiece in an XY direction causing the mounting ring 132 to contact housing 120 whereby the stylus 150 releases. The housing face 120D and the housing flange 120R provide limit stops for the movement of the stylus assembly 130. It also facilitates replacement of the stylus 150 with repeatability of results when styli are relocated.

Like the first embodiment, this embodiment also has the advantage when used in form measurement that the gauging force in the Z or axial direction is greater than the gauging force required in the X, Y plane. This embodiment is found to be particularly advantageous for use in form measurement on roundness instruments.

Features which distinguish this probe 110 from the probe 10 of FIGS. 1 to 5, are that the location of the transducers 160 and the design of the stylus assembly (in particular the mounting plate 134 and mounting ring 132) reduces the number of moving parts and displaces the centre of mass of those moving parts closer to the rest position of the stylus assembly. It also allows an increased Z direction travel because the diaphragm 140 is pre-stressed downwardly, providing increased protection from damage through over-travel.

Both embodiments provide a compact design which facilitates use of the probe 110 for following complex workpiece contours as well as a good trade-off between accuracy and repeatability on the one hand and frequency response on the other.

A further feature has been incorporated into the probes 10, 110 of the embodiments of FIGS. 1 to 5 and 8 to 13, namely means for damping the stylus movement. In the first embodiment, damping means 27F may be provided in the stylus assembly by applying a viscous substance between the linkage 70 and the adjoining linkage chamber walls 27D, as shown in FIG. 3.

Similarly, in the second embodiment, damping means 132F may be provided in the stylus assembly by applying a viscous substance between the mounting ring 132 and the sleeve 160G (for the transducer coil 160A) as shown in FIG. 8, 10. By way of example, the damping means 27F and 132F are provided by a charge of viscous substance, such as silicone grease.

Tests have shown that the addition of damping means 27F, 132F to the probe enhances its use on measuring instruments. The damping means provide the following advantages:

i) it greatly reduces unwanted stylus movement and vibration during instrument traverse when the stylus is out of contact with the workpiece;

ii) it reduces stylus vibration effects when scanning a surface;

iii) it allows the stylus to return to a stable rest position in a shorter elapsed time after stylus deflection.

Alternative damping means may be provided in a variety of ways other than the provision of a viscous substance. In addition, different probe applications may require different rates of damping. For example, a probe used with a roundness instrument may require a lower damping rate than when such a probe is used on a coordinate measuring machine.

Figure 14:
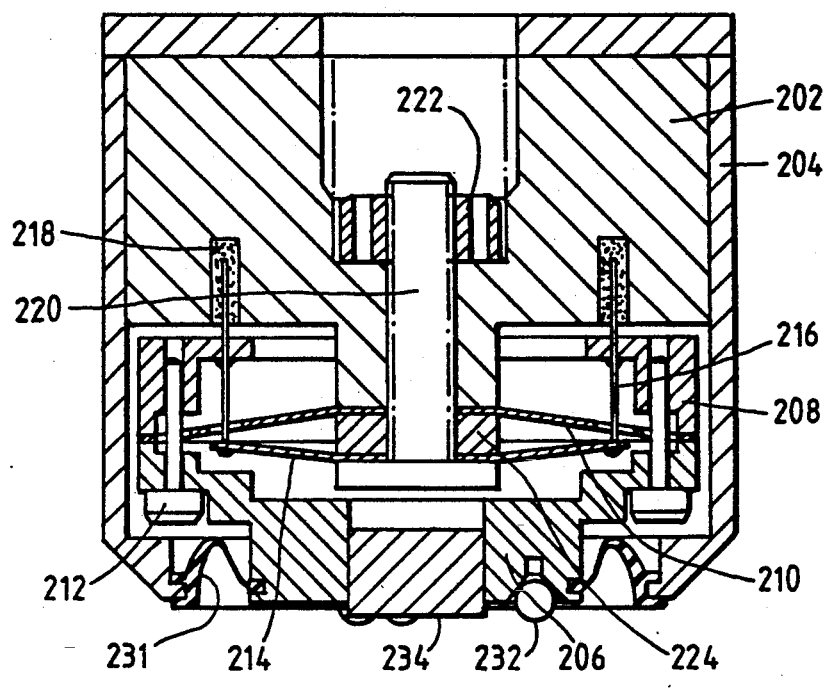
FIGS. 14 and 15 show longitudinal sections through a third embodiment of the present invention.
Figure 15:
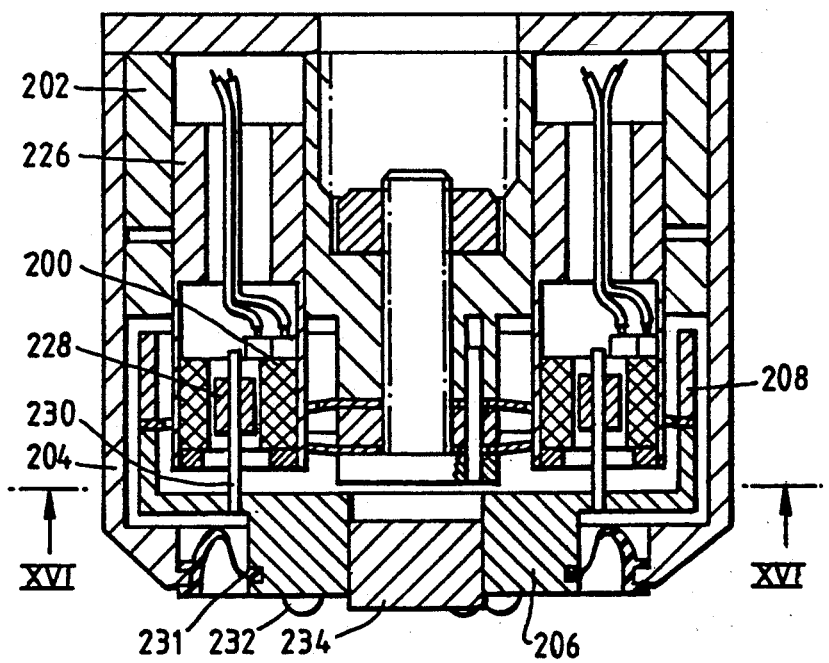

A third embodiment of the present invention is shown in FIGS. 14, 15 and 16. This embodiment combines some of the preferred features from the first and second embodiments.

In the third embodiment there are four transducers 200, as best shown in FIG. 16. This enables the transducers to be arranged in directly opposing pairs, which gives greater immunity to the effects of differential expansion within the probe. When four transducer signals are available calibration and measurement mathematical functions can be used in which signals from opposing pairs of transducers are substantially subtracted to deduce stylus displacement. In this way, any drift in the output signals which is common to all the transducers is cancelled out, improving measurement stability. FIG. 15 is a section through the probe along line XV—XV in FIG. 16, and accordingly shows two transducers 200 in section. FIG. 14 is a section through the probe along line XIV—XIV in FIG. 16, and does not show the transducers 200.

The probe comprises a main body 202 with a cylindrical casing 204, and a movable stylus mount which consists essentially of a mounting plate 206 and a mounting ring 208 which clamp the periphery of the diaphragm spring 210 between them. The mounting plate 206 and mounting ring 208 are held together by bolts 212.

Instead of the compression springs of the embodiment of FIG. 8, the pre-loading of the diaphragm 210 is provided by a flat pre-load spring 214 which tensions wires 216 which extend through the mounting ring 208 and are fastened to it by a convenient means, such as soldering. The wires 216 pass through respective clearance holes in the diaphragm 210. The wires 216 extend through the mounting ring 208 and into holes 218 in the main body 202, and a viscous material may be placed in the holes 218 to damp the movement of the stylus.

The pre-load spring 214 has four radially extending limbs from a central land (see FIG. 16). Both the diaphragm spring 210 and the pre-load spring 214 are clamped to the main body 202 at their centres by the action of a clamp bolt 220, which is secured by a nut 222 at the rear of the main body 202. The centre of the pre-load spring 214 is positioned below the centre of the diaphragm 210, and is spaced from it by a spacer 224. Each of the diaphragm 210 and pre-load spring 214 is planar when unstressed. Accordingly, when stressed in the manner shown in FIGS. 14 and 15 the diaphragm 210 tends to move the stylus mounting upwards, towards the main body 202, while the pre-load spring 214 acts on the stylus mount through the tension in the wires 216, and tends to drive it down, away from the main body 202.

The correct pre-load forces can be set by appropriate tooling when the wires 216 are attached to the mounting ring 208. This eliminates the need for pre-load adjustment means as provided in the embodiment of FIGS. 8 and 9. Because the wires 216 are firmly fixed to both the pre-load spring 214 and the mounting ring 208, and are under tension, the pre-load arrangement of this embodiment provides better stability and avoids possible lateral movement of the compression springs 180 in the arrangement of FIGS. 8 and 9, where at least one end of each spring must be free to move to permit the pre-load adjustment to be carried out.

As shown in FIG. 15, four transducer coils 200 are fitted to sleeves 226 in the main body 202. The sleeves 226 protrude beyond the lower surface of the main body 202, and through clearance holes in the diaphragm spring 210. As can be seen from FIG. 16, the four transducer coils 200 and sleeves 226 are displaced by 45° from the four arms of the pre-load spring 214. The arrangement of sleeves 226, transducers 200 and clearance holes in the diaphragm 210 is similar to the arrangement of corresponding parts in the embodiment of FIGS. 8 and 9. Armatures 228 for each transducer are attached rigidly to the back of the mounting plate 206 by respective rods 230.

A flexible annular seal 231 is provided between the mounting plate 206 of the movable stylus mount and the mouth of the cylindrical casing 204, to prevent entry of foreign substances.

The stylus is not shown in FIGS. 14 and 15. It is mounted onto the mounting plate 206 by an arrangement substantially identical to that illustrated in FIGS. 12 and 13, except that as shown in FIGS. 14 and 15, the precision balls 232 are mounted on the mounting plate 206. As in the previous embodiments, the stylus is held in place by the attractive force of a magnet 234.

Various modifications of the embodiment of FIGS. 14 to 16 are possible. For example, both the number of transducers and the number of active limbs of the pre-load spring 214 may be varied, although the pre-load spring 214 will normally need to have at least three active limbs to adequately define the equilibrium rest position of the stylus. Normally, the limbs will be equally spaced to provide a uniform gauging force characteristic. The use of free ends of the wires 216, extending through the mounting ring 208, as damping means is convenient and economic, but other damping arrangements can be adopted.

The arrangement of the diaphragm spring 210 and the pre-load spring 214 shown in FIGS. 14 to 16 has been selected to make the probe compact. Other arrangements are possible, such as:

i) clamping the stylus mount to the centre of the diaphragm spring 210 and clamping the main body 202 to its periphery;

ii) providing the pre-load spring 214 such that radial limbs are clamped at a radially outer end to the main body 202, and extend radially inwardly towards the centre;

iii) arranging the pre-load spring 214 so that it stresses the diaphragm 210 upwardly instead of downwardly;

iv) replacing the pre-load spring 214 with axially oriented tension springs connected to the wires 216, and supported from a part of the main body 202 or the cylindrical casing 204;

v) combining the functions of the diaphragm spring 210 and the pre-load spring 214 in a single component.

One possible arrangement for combining the functions of the diaphragm and the pre-load spring in one component is shown in FIGS. 17 and 18. FIG. 17 shows the shape of a combined spring 236. This has substantially the shape of the diaphragm spring 210 of the embodiment of FIGS. 14 to 16, except that radially extending arms 238 are formed in it by U-shaped cuts. FIG. 18 is a diagrammatic side view of an arrangement for using the combined spring 236 of FIG. 17. The centre of the spring 236 is connected to the main body 202 by the clamp bolt 220, and the arms 238 are connected to the wires 216 and provide the function of the pre-load spring 214 of FIGS. 14 to 16. The remainder of the combined spring 236 provides the function of the diaphragm spring 210, and is clamped at its periphery between the mounting plate 206 and the mounting ring 208.

As will be apparent to those skilled in the art, further variations are possible. For example, in all the illustrated embodiments at least one of the springs has the form of a diaphragm. Although this is normally preferred, it is not essential. In an alternative arrangement the diaphragm-shaped spring can be replaced by a spring having a central land connected to one part and radially extending fingers connected to another part. Alternatively, a spring having substantially the shape of a disc can be divided into a plurality of radial arms extending from a central land, and alternate radial arms may be connected to different members, while the central land may be free. A combined spring operating in a manner similar to that shown for the combined spring 236 in FIG. 18 may be provided by a plurality of arms extending from a central land, with the central land clamped to the main body of the probe and the outermost end of each arm clamped to the stylus mount, but the alternate arms are connected to the stylus mount at different heights, so that some arms are deflected upwardly and some are deflected downwardly to provide an action similar to that of the arrangement of FIG. 18. Furthermore, it may not always be necessary to use leaf-type springs. An arrangement may be provided in which, for example, some of the resilient means are tensioned coil springs.

In the light of the disclosure herein in which the embodiment of FIGS. 8 to 13 reduces the number of sensors/transducers from four to three, it will be apparent to those skilled in the art that the embodiment of FIGS. 1 to 5 may be modified to incorporate three sensors/transducers.

The diaphragm of the embodiments before assembly is disc-shaped and in planar condition (unstressed) so that when prestressed it takes a cone-like configuration. Modifications are possible whereby the diaphragm is pre-formed in a non-planar shape and then prestressed to adopt a different shape.

In each of the embodiments, the diaphragm (40, 140, 210) is in the form of a circular disc of uniform thickness and formed of beryllium-copper alloy which has been fully hardened. In each case the diaphragm is configured so as to permit connection at its centre to the main housing and connection at its periphery to the stylus assembly (as mentioned these could be reversed).

Figure 9:
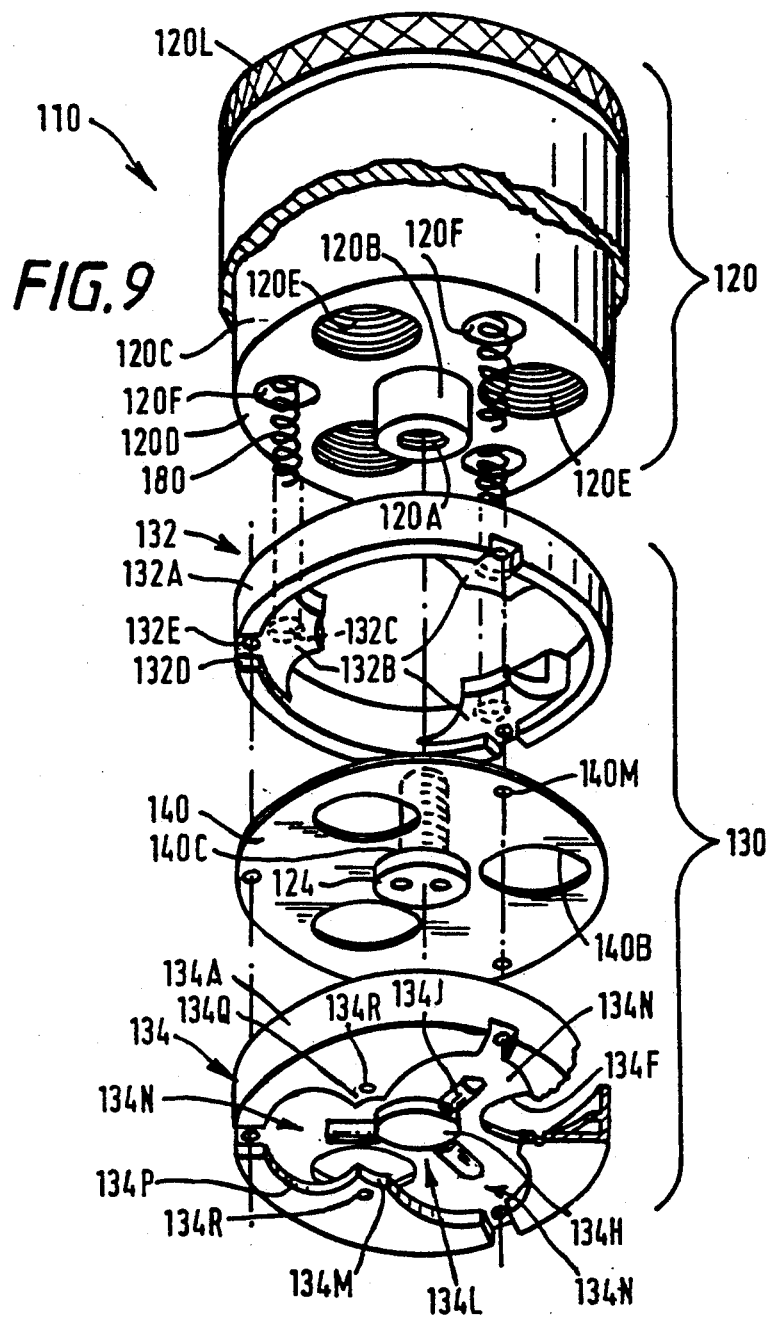
FIG. 9 shows an exploded perspective view of the probe of FIG. 8 with the stylus removed.
Figure 11:
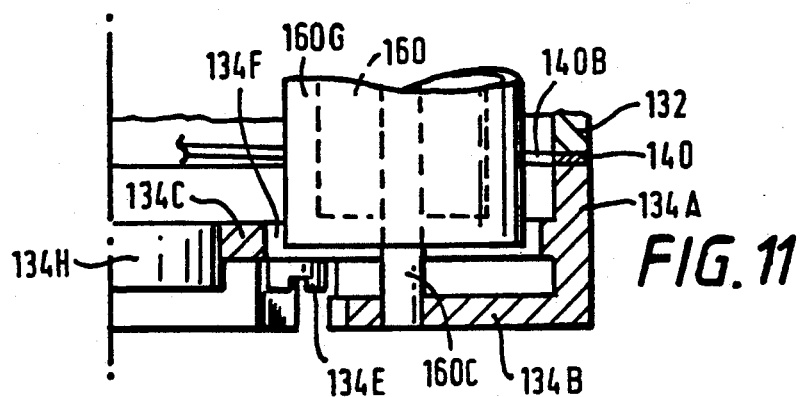
FIG. 11 shows an enlarged fragmentary view, partly in section, of part of the probe of FIG. 8.

Within the periphery of the circular diaphragm provision is made for other mechanical features of the probe. In the first embodiment, as shown in FIG. 2, the diaphragm 40 has apertures 40A for the passage therethrough of tensioned wires 22 connecting the linkage 70 to the mounting plate 34, and apertures 40E for assembly purposes. In the second embodiment, as shown in FIG. 9, the diaphragm 140 has further apertures 140B for the passage therethrough of the sleeves 134G carrying the transducer coils 160A, that is in addition to the apertures 140M for assembly purposes. The thickness of the diaphragm in the first and second embodiments is 0.003 in. (about 0.08 mm) and 0.005 in. (about 0.13 mm) respectively. The thickness is chosen so that given the required diaphragm dimensions and the stylus arm length, and the characteristics of the other part of the probe mechanism, the correct gauging stiffness is achieved in the XY directions at the stylus tip. A typical gauging stiffness in the XY directions for both probes is 100 mN per mm displacement when using a 100 mm stylus. Over the relatively small range of movement used, this stiffness remains substantially constant irrespective of displacement and direction.

For the first embodiment (FIG. 2), the Z-axis gauging stiffness is largely determined by the thickness and design of the diaphragm itself. For the second embodiment (FIG. 9) the Z-axis gauging stiffness is mainly a function of the biasing system, i.e. the nature of the compression springs and their arrangement.

When the probe is used with a roundness measuring instrument, the gauging stiffness in the Z direction is preferably an order of magnitude, more preferably two orders of magnitude, greater than the gauging stiffness in the XY directions.

The properties of beryllium-copper which render it especially suitable for the diaphragm include the facts that:

i) it permits higher deflections within its elastic limit than other comparable materials;

ii) it has a high endurance limit, i.e. it maintains its elastic properties over a long design life;

iii) it exhibits virtually no elastic hysteresis.

In the illustrated embodiments of the probe, its moving parts have relatively low mass, and the mass is mostly only a short distance from the centre of arcuate movement of the stylus. This results in a relatively low inertia of the moving parts for movement of the stylus tip, enabling a good frequency response to be obtained without excessive gauging forces. For example, with the embodiment of FIGS. 1 to 5, a natural frequency of about 50 Hz is obtained with a gauging force (XY) of 0.01N at a 1 mm displacement at the tip of a 100 mm stylus.

The use of opposed restoring forces to define an equilibrium rest position for the stylus enhances the repeatability and stability of the stylus movement, which assists in enabling accurate measurement with the probe. It is particularly valuable to support the stylus or stylus mount with a diaphragm which is pre-stressed into a conical shape as shown in the illustrated embodiments. The diaphragm provides a simple, light-weight and cheap way of supporting the stylus or stylus mount, providing a pivot for arcuate movement of the stylus, and providing some of the gauging stiffness. The pre-stressing of the diaphragm stabilises its performance as a pivot, and for this reason the operating range of the probe is preferably defined so that the diaphragm does not pass through its unstressed position within the operating range. This limitation of the operating range may be reflected in the construction of the probe. For example, the sensors may go out of range before the diaphragm reaches its unstressed position.

Another valuable feature of the illustrated embodiments is that all connections between the stylus and the probe body are flexible. By avoiding sliding contact and abutting surfaces (except continuous abutment against flexible connectors), the repeatability of the stylus movement is improved. However, the arcuate (tilting) movement of the stylus, as opposed to the translational movement as in some prior art devices, tends to make calibration of the probe important for accurate results.

Figure 20:
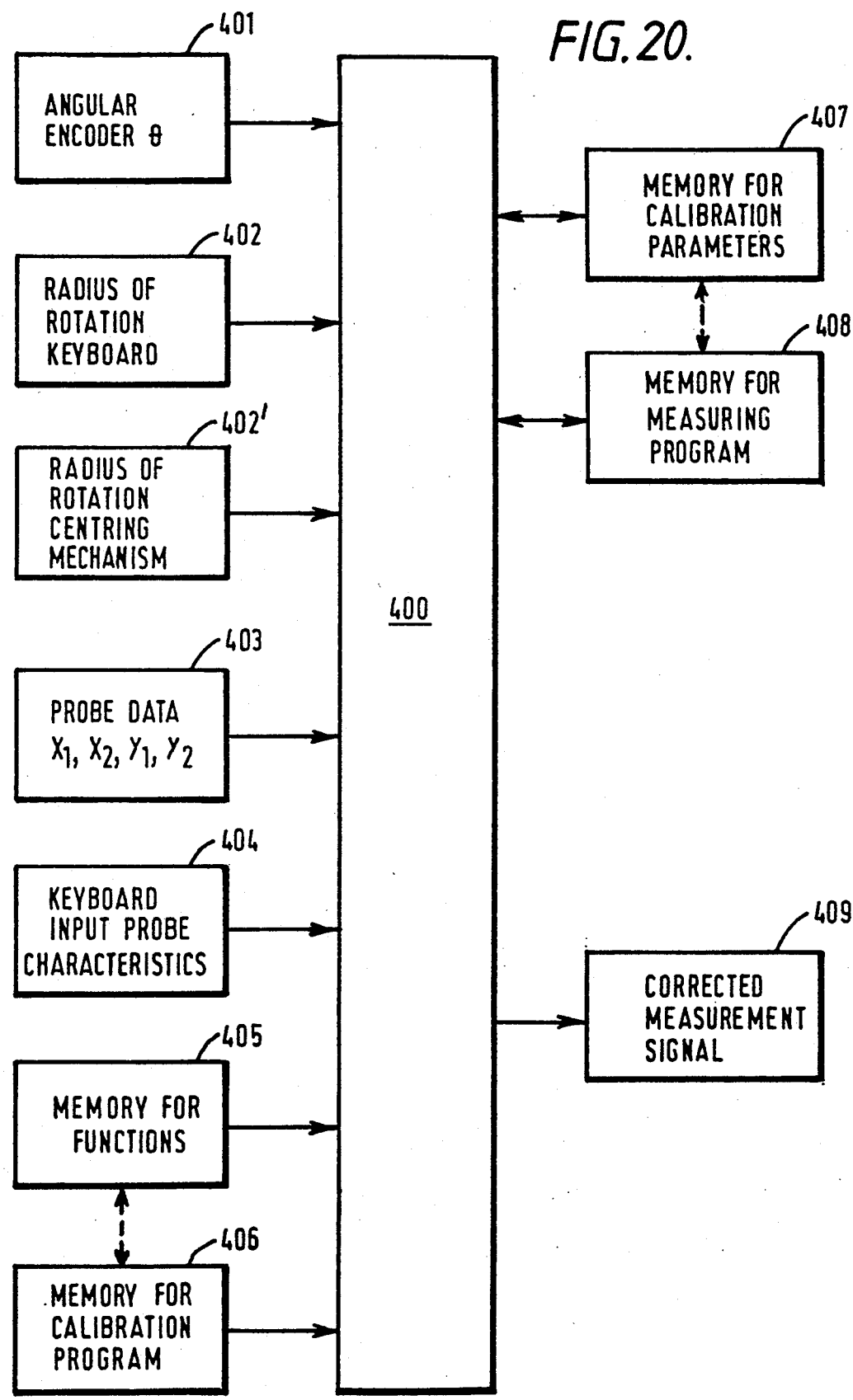
FIG. 20 shows a block diagram of data processing means associated with the measuring machine of FIG. 19.

Turning to FIGS. 19 and 20, an apparatus for, and a method of, calibrating a measuring probe 10 (such as described with reference to FIGS. 1 to 5) for the output of corrected X and Y axis measurement signals representing displacements of the probe in X and Y axis directions respectively, will now be described. As indicated in FIG. 1, a measuring probe 10 has a stylus 50 so mounted relative to a probe housing 20 as to permit two dimensional displacement of the stylus 50. Sensors 60 are responsive to the stylus movement to output sensor signals related to said stylus displacement. The calibration described herein enables the output of corrected measurement signals derived from said sensor signals.

Referring to FIG. 19, the calibration of probe 10 commences by arranging the probe 10 in a predetermined position relative to a turntable means 250 for displacing the stylus tip 56 (within the operating range thereof) along a defined circular path. The Z-axis of probe 10 is aligned by a probe carrying arm 252 of a measuring machine, on which the probe 10 is mounted, with the rotational axis 254 of turntable means 250.

The turntable means 250 carries a slide block arrangement 256 on which a guide means 258 is mounted such that the radial position of the guide means 258 may be incrementally displaced relative to the axis 254. The guide means 258 contacts the stylus tip 56 of the probe 10. Radial displacement of the guide means 258 causes the stylus tip 56 to be displaced radially relative to axis of rotation 254. When the turntable means 250 is rotated it carries the guide means 258, and thus the stylus tip 56, on a circular path.

To calibrate the probe 10, the turntable means 250 is rotated to displace the stylus tip 56 along along a circular path in discrete steps corresponding to a given angular movement $\theta$ of the turntable 250. The measuring machine gathers as sensor data the sensor output signals of each sensor 60 (FIG. 1) for each of a series of measurement positions of the stylus 50. The measurement positions are determined by the discrete steps of the turntable means 250.

Positional data is also gathered giving the measurement position of the stylus 50 for each of the measurement positions. This positional data is gathered independently of the probe output signals. It may be in terms of the radius of rotation R of the stylus tip 56 and the discrete angular movement $\theta$, and may be determined from the position of the turntable 250 (e.g. by an angular encoder) and the guide means 258.

As aforedescribed the discrete measurement positions at which probe (sensor) data and positional data have been gathered have been determined by discrete angular movements of the turntable means 250. It will be appreciated that the angular movement of the turntable means 250 could be continuous (for a given circular path) and that the measurement positions could be determined as discrete locations at which the sensor signals and angular encoder signals are gathered.

Data processing means 400 (see FIG. 20) then performs a correlation between the sensor data and the positional data so as to obtain calibration parameters for correction of the measurement -signals. The data processing means 400 then stores the calibration parameters in such manner that during subsequent measurement operations the sensor output signals are processed to produce corrected measurement signals.

In this context, positional data is derived by measuring the radial displacement (R) of said guide means 258 and the angular displacement $\theta$ of the turntable means 250: the X,Y co-ordinates of the measurement position being given by the expressions $X = R \cdot SIN\ \theta$ and $Y = R \cdot COS\ \theta$.

In order to obtain sufficient data for calibration, the guide means 258 is rotated by the turntable 250 to pass in sequence through a first series of measurement positions (R, $\theta$) each at a first radial spacing R from the axis of rotation 254. The guide means 258 is then displaced radially, and rotated through a second series of measurement positions, and so on for a series of radial displacements.

The radial displacement of the guide means 258 is effected within a range of radial positions. One extremity thereof is defined by a radially inner position of the guide means 258 which is sufficiently displaced from rotational axis 254 to permit the guide means 258 to displace the stylus tip 56 in a rotary path whilst maintaining constant contact therewith. If the radius R is too small, the guide means 258 may lose contact with the stylus tip 56 at some angular positions. The other extremity is a radially outward position which does not extend beyond a pre-designated measuring range of the probe 50; by way of example for this probe 10, the range is defined by a radius of rotation of 2 mm with a stylus length of 100 mm. The angular displacements are illustrated by regular displacements each of 30°. In this embodiment the radial displacements of the guide means 258 commence from the radially inner extremity and progress successively in the direction of the radially outer extremity of the probe measuring range.

A probe may have a pre-designated measuring range defined by a radius of X mm. In that context, the guide means may be successively displaced radially outwardly by successive steps of X/Nmm, wherein N is an integer greater than 2 and less than an arbitrary number chosen for practicability, for example 7. In this embodiment, N was selected as 4, i.e. successive steps are 0.5 mm apart.

The correlation by the data processing means 400 can be performed for probes with a plurality of sensors. When the probe has a plurality of sensors with sensor output signals $t_1 \ldots t_n$, the values for the X,Y co-ordinates for each measurement position are derived from positional data and are employed to derive calibration parameters for expressions $X = f_1(t_1 \ldots t_n)$ and $Y = f_2(t_1 \ldots t_n)$, where the functions $f_1$, $f_2$ contain the calibration parameters.

Probe 10 has sensors 60 spaced in one direction with sensor output signals $X_1, X_2$ and sensors space transverse direction with sensor output signals $Y_1, Y_2$. The values for the X,Y co-ordinates for each measurement position are derived from the positional data and are employed in the correlation step to derive calibration parameters for the expressions $X = f_1(X_1, X_2, Y_1, Y_2)$ and $Y = f_2(Y_1, Y_2, X_1, X_2)$, which contain the calibration parameters.

For the X,Y co-ordinates the expressions $f_1, f_2$ are each calculated as the product of a first measurement expression and a second compensating expression derived from the outputs of the sensors, the first measurement expression being associated with the measurement axis and the second compensating expression being associated with the axis orthogonal to the measurement axis to compensate for variations in the sensor data.

In this embodiment, for the measurement of the X co-ordinate the measurement expression is defined by $(A_1 \cdot X_1 + A_2 \cdot X_2 + B_1 \cdot X_1^2 + B_2 \cdot X_2^2 + C_1)$ wherein $A_1, A_2, B_1, B_2$ and $C_1$ are calibration parameters, and is multiplied by the compensating expression which is expressed as $(D_1 \cdot 1 + D_2 \cdot Y_2 + E_1 \cdot Y_1^2 + E_2 \cdot Y_2^2 + G_1)$ wherein $D_1, D_2, E_1, E_2$ and $G_1$ are calibration parameters. Likewise, for the measurement of the Y co-ordinate the measurement expression is defined by $(A_3 \cdot Y_1 + A_4 \cdot Y_2 + B_3 \cdot Y_1^2 + B_4 \cdot Y_2^2 + C_2)$ wherein $A_3, A_4, B_3, B_4$ and $C_2$ are calibration parameters, and is multiplied by the compensating expression which is expressed as $(D_3 \cdot X_1 + D_4 \cdot X_2 + E_3 \cdot X_1^2 + E_4 \cdot X_2^2 + G_2)$ wherein $D_3, D_4, E_3, E_4$ and $G_2$ are calibration parameters.

In this embodiment, the correlation also compensates the positional data for set-up errors in the position of the probe 50 relative to the rotational axis 254. As aforesaid, these errors are expressed by the calibration parameters $C_1$ and $C_2$ for eccentricity and $dR_1$, $dR_2$ in the radial distance R and $d\theta_1$, $d\theta_2$ in the angular displacement $\theta$. By determining the values of $dR_1$, $dR_2$ and $d\theta_1$, $d\theta_2$ in the expressions $X = (R + dR_1) \cdot \text{SIN}(\theta + d\theta_1)$ and $Y = (R + dR_2) \cdot \text{COS}(\theta + d\theta_2)$, set up errors are also compensated.

An explanation of these offset parameters is as follows. Firstly, when the probe rest position is aligned with the axis of rotation 254 of the turntable means 250, in practice the stylus tip is arranged eccentrically relative to the rotational axis: it is the calibration parameters $C_1$, $C_2$ which compensate for this in functions of $f_1$ and $f_2$. More accurately, since the measurement expression is multiplied by the compensating expression, the eccentricity is accounted for by the products $C_1 \cdot G_1$ and $C_2 \cdot G_2$. However, $G_1$ and $G_2$ will have values close to one, since they would otherwise alter the gain of the measurement expression, and therefore it is the values of $C_1$ and $C_2$ which provide the effective eccentricity compensation.

Secondly, (because of this eccentricity) in order to be able to rotate the guide means whilst maintaining constant contact with the stylus tip, it is necessary to introduce a small radial offset from the nominal rest position. This offset results in the radius of rotation of the stylus tip dR for the initial movement of the turntable. Since there is no datum point to work from (i.e. no absolute rest position), measurements are taken from this initial radial offset, i.e. R is taken as zero at this radial offset. For the purposes of correlation, it is necessary to analyse all data so as to determine dR. This enables the calibration to adjust the positional data to true polar co-ordinates originating at the rest position of the stylus. In practice, as two separate correlations are performed, one for each axis, it is convenient to use two parameters for dR, namely $dR_1$ and $dR_2$, which are determined independently. By comparing the values of $dR_1$ and $dR_2$, an indication of the validity, or quality, of the particular calibration is given, as in fact there is only one error, dR, irrespective of axis. For a good quality calibration with this probe, the deduced values of $dR_1$ and $dR_2$ typically differ by no more than 0.5 micrometers ($\mu$m).

Thirdly, there is the angular offset $d\theta$. This arises because the locations of the probe sensors may be such that these sensors are not aligned with the axes of the X,Y co-ordinates associated with the turntable means (e.g. as defined by an encoder which measures $\theta$). Thus there may be an angular offset between the directions in which probe sensors $X_1$ and $X_2$, and $Y_1$ and $Y_2$, are spaced apart and the notional X, Y axes of the turntable-/encoder (and hence the positional data). In addition, the direction in which probe sensors $X_1$ and $X_2$ are spaced apart and the direction in which the probe sensors $Y_1$ and $Y_2$ are spaced apart may not be truly 90° apart. By determining the offset parameters $d\theta_1$, $d\theta_2$ for the X, Y axes respectively, the correlation avoids errors of this nature. The difference between the offset parameters $d\theta_1$, $d\theta_2$ relates to the positions of the transducers relative to a 90° spacing.

The radial and angular offset parameters $dR_1$, $dR_2$, $d\theta_1$ and $d\theta_2$ do not appear in the expressions for X and Y. These parameters are used in the calibration operation, but their values are not required once the parameters $A_1$ to $G_2$ have been deduced and stored.

In this preferred embodiment, the calibration parameters are derived for X in a series of steps, and then the calibration parameters are derived for Y in a separate series of steps.

It has been found useful to perform calculations for some calibration parameters in the correlation step(s) for X (or Y) by manipulating actual positional data and transducer data whilst holding others of said calibration parameters constant. Then successive calculations are made changing which calibration parameters are maintained constant until all the calibration parameters have been determined from positional and transducer data.

In more detail, the calibration procedure is as follows.

At each measurement position of the probe, values are obtained for the sensor outputs $X_1$, $X_2$, $Y_1$ and $Y_2$, and the positional data R and $\theta$. Thus for the i-th measurement position, the values $X_1(i)$, $X_2(i)$, $Y_1(i)$, $Y_2(i)$, $R(i)$ and $\theta(i)$ are obtained and stored. For this measurement position the true values of X and Y, defining the actual position of the probe, are given by:

$$X(i) = [R(i) + dR_1] \cdot Sin[\theta(i) + d\theta_1] \text{ and}$$

$$Y(i) = [R(i) + d\theta_2] \cdot Cos[\theta(i) + d\theta_2]$$

Each of the measurement expression and the compensating expression for X and Y is a polynomial, the coefficients of which are calibration parameters. Various techniques are known to determine the values of co-efficients of polynomials to fit the polynomial to experimental data, and in the present embodiment the Gauss Newton method is preferred. See Gill P. E, Murray W. and Wright M. H. "Practical Optimisation", Academic Press, London, 1981 for further information.

The X and Y axes are fitted independently, and by identical methods. Therefore the method for the X axis only will be described. Using the data obtained at the measurement positions, the following expression can be obtained for each i-th measurement point:

$$Error(i) = [R(i) + dR_1] \cdot Sin[\theta(i) + d\theta_1] - f_1[X_1(i), X_2(i), Y_1(i), Y_2(i)],$$

where $f_1 = $ (measurement expression for X).(compensating expression for X).

This can be paraphrased as:

$$Error(i) = Actual\ position(i) - Measured\ position(i).$$

Before the calibration calculations begin, the calibration parameters $dR_1$, $d\theta_1$ and $A_1$ to $G_1$ in function $f_1$ are set to initial values. If a probe which has already been calibrated is being re-calibrated, it may be helpful to set the initial values to the previously obtained values for the calibration parameters. Otherwise, default values are used. The default values are '1' for $A_1$, $A_2$ and $G_1$, and are zero for all the other parameters.

Clearly at this stage, the values of "Error" for the data points "i" will be large and will reflect unwanted characteristics of the probe which the calibration operation is intended to remove. Taking all data points into account, the "Gauss Newton" method could now be performed to attempt to determine the values for the calibration parameters such that all values of "Error" are minimised. However, doing this usually gives unstable results due to the large number of calibration parameters to be determined. Therefore the parameters are determined in the following stages.

Stage 1

Hold the parameters in the compensating expression constant and perform a fit using the "Gauss Newton" method to adjust the $dR_1$, $d\theta_1$, and the parameters in the measurement expression so as to minimise the values of "Error".

Stage 2

Hold $dR_1$, $d\theta_1$, and the parameters in the measurement expression constant and use the "Gauss Newton" method to adjust the parameters in the compensating expression so as to minimise the values of "Error".

Stage 3

Repeat stages 1 and 2 until the values of "Error" are no longer decreasing, the fit is then complete.

Once the process is complete, the remaining values of "Error" are the residual errors.

The range of residual errors indicates the quality (or linearity) of the axis in question over the full range of two-dimensional stylus movement. It will be appreciated that there are various graphical representations that can be used to illustrate the nature of the residual errors over the range of the calibration data.

Residual errors reflect characteristics of the calibration data which cannot be mathematically fitted. The residual errors may arise from various sources, such as:

i) Random environmental effects such as mechanical vibration, electrical noise, foreign particles on the stylus tip or changing temperature.

ii) Variations resulting from manufacturing differences and imperfections of the probe, and/or the calibrating means.

iii) Characteristics of the design of the probe which cannot be described mathematically by the calibration functions.

Residual errors from source (iii) may be reduced by varying the calibration functions, e.g. to include third or higher powers of $X_1$, $X_2$, $Y_1$, $Y_2$, at the expense of considerably increased calculations both during calibration and during subsequent use of the probe.

Turning again to FIG. 19, the apparatus may itself comprise a form measuring machine (such as the aforesaid TALYROND 300) further incorporating the guide means 258 and the data processing means 400 (FIG. 20).

The slide block 256 has a carriage 260 displaceable on a slide 262 by means of the manually adjustable drive comprising a micrometer adjuster 264 rotatable relative to a mount 266 to displace a shaft 268 to an initial position (the aforesaid inner extremity). Subsequent positions of the slide block 256 may be determined by the insertion of slip blocks 270 (one of which is illustrated) thereby to increment the radius of rotation of the guide means 258 (and thereby the stylus tip 56) relative to the axis of rotation 254 of turntable 250. The slip blocks 270 (known per se) are precision blocks used in sequence to increment the radius R e.g. by steps of 500 micrometers (as previously indicated).

The measuring machine is not fully illustrated: the probe carrying arm 252 is shown schematically together with the turntable 250 and an angular encoder 272 with associated sensor 274 which enables a signal to be entered into the data processing means 400 indicating angular increments made by the turntable 250 between measurement positions.

The guide means 258, which is further illustrated in an inset plan view in FIG. 19, comprises a main body 276 adapted to be supported on the turntable 250 (e.g. by means of slide block 256), and a pair of abutments 278 secured thereto by attachment means 280. The attachment means 280 may be formed of a settable adhesive. The abutments 278 may be a pair of precision made needle bearings. They are arranged and spaced so as to receive therebetween, in kinematic contact therewith, the stylus tip 56 of the probe 10.

Rotation of the turntable 250 both moves the guide means 258 around a circular path and rotates the direction in which it faces. Thus, for all values of $\theta$ the guide means 258 holds the stylus tip 56 securely away from its rest position. In this way the stylus 50 can be moved during calibration through at least 180° (and in practice through 360°) around its rest position without losing contact with the guide means. This is difficult to achieve in some prior art calibration systems where the guide means does not hold the stylus tip securely for all angles. Movement of the guide means 258 causes the stylus 50 to experience displacements in the XY plane during calibration in the same manner as it experiences displacements during measuring operations (although the pattern of movement may differ because the stylus tip 56 will typically travel over a workpiece in a sliding contact therewith whereas it does not travel over the guide means 258).

Turning to FIG. 20, there is illustrated in block diagram a data processing means 400 associated with the form measuring machine. During calibration positional data $(R,\theta)$ is input for each measurement position. The angle of rotation $\theta$ is input from the angular encoder 401. The measured radius of rotation R may be input via a keyboard 402: the initial input is assumed to be zero (and compensated for in the calibration) and subsequent inputs being the incremental increase in this radius determined by a slip block 270. Alternatively, if the turntable has its own centring mechanism for X,Y incremental positional changes thereof, then incremental changes (e.g. 0.5 mm) of radius R may be directly input from the centring mechanism 402′. The sensor signals $X_1$, $X_2$, $Y_1$, $Y_2$, ( or $t_1$, $t_2$, $t_3$. . .) are read for each measurement position to derive the sensor data 403. As aforesaid the sensors 60 generate analogue sensor signals which are digitised and scaled for use as inputs 403 by the data processing means 400.

The data processing means 400 has an input from a memory 405 which stores the probe data conversion functions $f_1$ and $f_2$ (in "blank" form without values for the calibration parameters) for particular probe constructions; the probe characteristics will be input at keyboard 404. A memory means 406 carries a calibration program which executes the correlation of the positional data and probe data to calculate the values of calibration parameters. The data processing means 400 outputs the calibration parameters to a memory 407 which stores the calibration expressions including those values for the calibration parameters for use in measuring operations of the probe. The measuring program is stored in a memory 408. Once the probe has been calibrated, then measuring operations may commence and the data processing means 400 will operate under the control of the measuring program stored in memory 408 to output corrected measurement signals 409. These signals 409 are obtained by computing the X,Y co-ordinates from the functions, expressions and parameter values stored in memory 407 on the basis of measurements input as probe data at 403. Memories 405,406 and memories 407,408 are shown joined by dashed lines: this is to indicate symbolically that the functions, expressions and parameter values stored at 405,407 may be stored in the respective programs in memories 406,408. It will be appreciated that the data processing means 400 may incorporate a modular unit whereby the memories 404 to 408 may be interchangeable as different probes 50 are employed.

Similarly, it will be appreciated that the calibration parameters, possibly together with the measurement program, may be stored in a transportable medium for transfer to a users measuring machine. In the alternative, this may be accomplished by the transfer of data from the measuring machine used for calibration to a measuring machine employing that probe for measurements.

I claim:

1. A probe for measuring workpieces, the probe having a longitudinal Z axis and comprising a body and a stylus or stylus mount having a rest position relative to the body defined by the equilibrium between a plurality of restoring forces the magnitude of at least one of which: (a) varies with the displacement of the stylus or stylus mount; and (b) is provided by a diaphragm spring, such that movement of the stylus or stylus mount in the Z axis direction changes the degree to which the diaphragm spring has a conical shape.

2. A probe according to claim 1 in which the magnitude of a plurality of said restoring forces varies with displacement of the stylus or stylus mount.

3. A probe according to claim 2 comprising a resilient member, the diaphragm spring acting on said stylus or stylus mount in a first direction and the resilient member acting on said stylus or stylus mount in a second direction opposing the first.

4. A probe according to claim 3 in which the second member is a compression spring.

5. A probe according to claim 3 which further comprises one or more further resilient members, each acting on the stylus or stylus mount in a direction opposing the first direction.

6. A probe according to claim 3 in which the first and second directions are substantially anti-parallel.

7. A probe according to claim 3 in which the resilient member comprises a substantially sheet-like member.

8. A probe according to claim 7 in which the resilient member comprises one or more leaf spring portions.

9. A probe according to claim 7 in which the resilient member acts on the body or on the stylus or stylus mount through one or more tension members.

10. A probe according to claim 1 in which the diaphragm spring is oriented in a plane substantially transverse to the Z axis.

11. A probe according to claim 10 in which the diaphragm spring is stressed to a substantially conical shape when the stylus or stylus mount is in its said rest position.

12. A probe according to claim 2 comprising a resilient member having a first part which provides said diaphragm spring and acts on said stylus or stylus mount in a first direction and a second part which acts on said stylus or stylus mount in a second direction opposing the first.

13. A probe according to claim 12 in which the first and second directions are substantially anti-parallel.

14. A probe according to claim 1 in which the gauging force in the Z axis direction is at least an order of magnitude greater than the gauging force in the plane transverse to the Z axis direction.

15. A measuring probe having a longitudinal Z axis and comprising:

a body;

a stylus or stylus mount;

a first restoring means supporting the stylus or stylus mount relative to the body for movement through a measuring range and applying a first restoring force between the body and the stylus or stylus mount;

second restoring means acting on the body and the stylus or stylus mount and applying a second restoring force therebetween opposing the first restoring force;

at least one transducer providing an output in accordance with the position or movement of the stylus or stylus mount;

the first and second restoring means providing the first and second restoring forces in opposition to each other throughout the said measuring range; and the first restoring means comprising a diaphragm spring, such that movement of the stylus or stylus mount in the Z axis direction changes the degree to which the diaphragm spring has a conical shape.

16. A probe according to claim 15 in which all the connections between the body and the stylus or stylus mount are flexible.

17. A probe according to claim 15 in which the first and second restoring means comprise parts of a common member.

* * * * *

UNITED STATES PATENT AND TRADEMARK OFFICE
CERTIFICATE OF CORRECTION

PATENT NO. : 5,209,131
DATED : May 11, 1993
INVENTOR(S) : Iain K. Baxter

It is certified that error appears in the above-identified patent and that said Letters Patent is hereby corrected as shown below:

Column 9, Line 42-43, "X-$_1$" should read --X$_1$--.

Column 12, Line 21, after "FIG. 8." insert a new paragraph.

Column 13, Line 36, "}" should read --)--.

Column 24, Line 52, "-signals" should read --signals--.

Column 25, line 40 "space" should read --spaced in a--

Column 25, Line 60, "$(D_1 \cdot _1 + D_2 \cdot Y_2 + E_1 \cdot Y_1^2 + E_2 \cdot Y_2^2 + G_1)$" should read --$(D_1 \cdot Y_1 + D_2 \cdot Y_2 + E_1 \cdot Y_1^2 + E_2 \cdot Y_2^2 + G_1)$--.

Signed and Sealed this

Eighth Day of February, 1994

BRUCE LEHMAN

*Attest:*

*Attesting Officer*        *Commissioner of Patents and Trademarks*